US008593571B2

(12) United States Patent
Sato

(10) Patent No.: US 8,593,571 B2
(45) Date of Patent: Nov. 26, 2013

(54) INFORMATION PROCESSING APPARATUS AND NON-TRANSITORY RECORDING MEDIUM

(75) Inventor: Teruyuki Sato, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 167 days.

(21) Appl. No.: 13/243,389

(22) Filed: Sep. 23, 2011

(65) Prior Publication Data
US 2012/0013796 A1 Jan. 19, 2012

Related U.S. Application Data

(63) Continuation of application No. PCT/JP2009/056143, filed on Mar. 26, 2009.

(51) Int. Cl.
*H04N 7/01* (2006.01)
(52) U.S. Cl.
USPC ........................... 348/441; 348/452; 348/459
(58) Field of Classification Search
USPC ......... 348/441, 446, 448, 451, 452, 458, 459, 348/699–701
IPC ..................................... H04N 7/01,11/20, 5/14
See application file for complete search history.

(56) References Cited

U.S. PATENT DOCUMENTS

| 5,453,801 A * | 9/1995 | Kim ............................... 348/699 |
| 8,385,602 B2 * | 2/2013 | Kaino et al. .................. 348/699 |
| 2001/0017889 A1 | 8/2001 | Borer |
| 2008/0100745 A1 | 5/2008 | Matsubara |
| 2009/0015712 A1 | 1/2009 | Sato et al. |

FOREIGN PATENT DOCUMENTS

| JP | 2828096 | 11/1998 |
| JP | 11-513541 | 11/1999 |
| JP | 2008-28850 | 2/2008 |
| JP | 2008-118223 | 5/2008 |
| WO | 2009/011009 | 1/2009 |

OTHER PUBLICATIONS

International Search Report, mailed Jun. 30, 2009, in International Application No. PCT/JP2009/056143 (2 pp.).
International Preliminary Report on Patentability mailed Oct. 27, 2011 issued in corresponding International Patent Application No. PCT/JP2009/056143.
Japanese Office Action mailed Jan. 29, 2013 for corresponding Japanese Application No. 2011-505759.

* cited by examiner

*Primary Examiner* — Sherrie Hsia
(74) *Attorney, Agent, or Firm* — Staas & Halsey LLP

(57) ABSTRACT

An information processing apparatus has: a first motion vector calculation unit which determines a first motion vector between one image frame and an image frame immediately before this one image frame in a second image frame group which frame rate is an n number of frames per predetermined time; a second motion vector calculation unit which determines a second motion vector between one image frame and an image frame which is n frames before the one image frame in the second image frame group; and a detection unit which detects that the second image frame group has been obtained from a first image frame group which frame rate is an m number of frames per the predetermined time by the frame conversion, when the ratio of the first motion vector and the second motion vector is in a predetermined range.

5 Claims, 26 Drawing Sheets

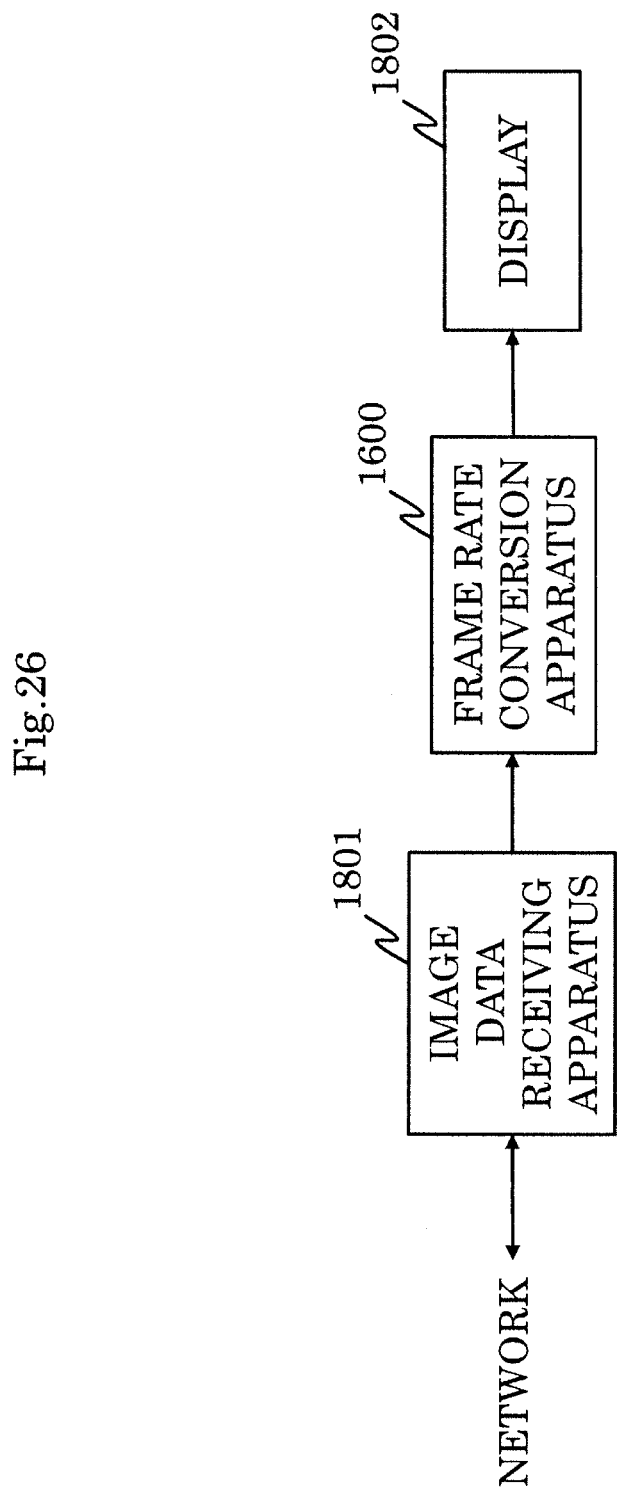

INFORMATION PROCESSING APPARATUS AND NON-TRANSITORY RECORDING MEDIUM

CROSS-REFERENCE TO RELATED APPLICATION

This is a continuation of Application PCT/JP2009/056143, filed on Mar. 26, 2009, now pending, the contents of which are herein wholly incorporated by reference.

FIELD

The present invention relates to an information processing apparatus which handles a moving image generated at a source rate, the moving image being converted from an image generated at a frame rate lower than the source rate.

BACKGROUND

A broadcasting frame rate defined by NTSC (National Television Standards Committee), a standard of analog television system, is 29.97 fps (frames per second) interlaced. Hereafter this frame rate is denoted as "30 fps" or "60i" to simplify description. Natural movement of moving images is provided if the frame rate upon capturing a moving image and the frame rate upon broadcasting match.

The moving image materials to be broadcasted include movies and animation. The moving image capturing frame rate of movies and animation is normally 24 fps progressive format. And this is denoted as "24p" herein below. To broadcast 24p moving image materials according to the NTSC standard, 2-3 pulldown processing is performed for converting 24p into 60i.

FIG. 1 is a diagram depicting an example of the 2-3 pulldown processing. A frame rate upon capturing moving image materials is called "source rate", a frame rate upon broadcasting is called "broadcasting rate", and a frame rate upon replaying moving images in a replay apparatus is called "display rate". In NTSC, one frame consists of two fields: an odd field and an even field. A field in which only odd scan lines are drawn, out of all the scan lines of one frame, is called an "odd field". A field in which only even scan lines are drawn, out of all the scan lines of one frame, is called an "even field".

An example of the 2-3 pulldown processing will be described below. FIG. 1 indicates a moving image material of which source rate is 24 fps, and the moving image material includes a frame F1 to a frame F4. To transmit the frame F1 to the frame F4 at 60i, two fields, that is an odd field F1$a$ and an even field F1$b$, are generated from the frame F1, which are transmitted in the sequence of the odd field F1$a$ and the even field F1$b$. After transmission of the frame F1, an odd field F2$a$ and an even field F2$b$ are generated from the frame F2, which are transmitted in the sequence of the odd field F2$a$ and the even field F2$b$ and the odd field F2$a$. The same processing for frame F1 and frame F2 is also executed for the subsequent frames, frame F3 and frame F4. In other words, an odd field F3$a$ and an even field F3$b$ generated from the frame F3 are transmitted in this sequence, then an odd field F4$a$, an even field F4$b$ and an odd field F4$a$, generated from the frame F4, are transmitted in this sequence. Thus according to the 2-3 pulldown processing, a processing for transmitting two fields for one frame and a processing for transmitting three fields for one frame are alternately repeated for a plurality of 24 fps frames. In the processing for transmitting three fields, an odd field having identical content is transmitted twice.

According to this 2-3 pulldown processing, 60 fields can be generated and transmitted from 24 frames, so as to match the display rate (60p) of a TV receiver and the frame rate of broadcasting. As a result, moving images of which source rate is 24 fps can be broadcasted at 60i. Hereafter "converting a frame rate" or "a frame rate conversion" refers to executing such a processing as the 2-3 pulldown processing on moving image materials, so as to convert a frame rate into a frame rate that is different from the source rate.

If an image frame of which frame rate is converted into 60i is input to a progressive scan type display apparatus which displays images at 60p, for example, a pulldown cancellation is performed in the display apparatus, so that the original frames are restored. In other words, if two fields are received for one frame (e.g. frames F1 and F3 in FIG. 1), the display apparatus combines the received two fields (that is, an odd field and an even field) to generate two original frames. For example two F1 frames are generated from the odd field F1$a$ and the even field F1$b$. If three fields are received for one frame (e.g. frames F2 and F4 in FIG. 1), on the other hand, the display apparatus generates three original frames from the received three fields (two odd fields and one even field). For example, three F2 frames are generated from the two odd fields F2$a$ and the even field F2$b$.

The display apparatus draws the generated original frames on screen according to the display time axis (display rate) of 60p. As a result, the processing of displaying the 24 fps frames, such as the frames F1 and F2 twice, and the processing of displaying 24 fps frames, such as the frames F2 and F4 three times, are executed alternately on the display time axis (see FIG. 1).

Recently one segment partial reception service for portable telephones and mobile terminals began. The one segment partial reception service for portable telephones and mobile terminals is normally called "One Seg", which is a terrestrial digital broadcasting service that enables TV programs to be played on mobile phones, car navigation systems and other portable devices. The frame rate of One Seg, that is a broadcasting rate thereof, is about 15 fps. So the broadcasting rate of One Seg is hereafter regarded as 15 fps to simplify description.

Thus the broadcasting rate of One Seg is lower than the frame rage of current analog TV broadcasting (60i) and frame rate of 24 fps moving image materials. In the case of display moving images which are input at a broadcasting rate that is lower than the source rate, such as a case of broadcasting 24 fps moving image materials in One Seg, the following problems occur.

FIG. 2 illustrates an example of processing for converting the frame rate 24 fps into the frame rate 15 fps. In the case of the example in FIG. 2, eight frames (frames A to I in FIG. 2) corresponding to ⅓ second at 24 fps respectively are converted into five frames corresponding to ⅓ seconds at 15 fps. In this example, three frames, such as frames C, E and H, are skipped from the original eight frames. Therefore, there is likelihood that the motion of the moving image becomes unnatural.

In order to solve the unnatural motion of moving images, a technology to insert intermediate frames among frames is available. The processing for inserting intermediate frames among frames is called "frame interpolation".

By interpolating and displaying intermediate frames, which correspond to the frames skipped during converting frame rates, among the images which were input at 15 fps, moving images having natural motion are displayed in the display apparatus. However, in the case of displaying moving image material of which source rate is 24 fps in One Seg of which broadcasting rate is 15 fps, the skipped sections of frames upon frame the rate conversion cannot be specified. In other words, in a case of displaying moving image material of which source rate is 24 fps in One Seg of which broadcasting rate is 15 fps, frames are not appropriately interpolated, and unnatural motion can be generated in moving images.

[Patent document 1] Japanese Patent Application Laid-Open No. 2008-028850

[Patent document 2] Japanese Translation of PCT Application No. H11-513541

SUMMARY

According to an aspect of the present invention is an information processing apparatus. This information processing apparatus is an information processing apparatus which detects a second image frame group, of which frame rate has been converted from a source rate of a first image frame group, that is, an m number of frames per predetermined time, into an n (n<m) number of frames per same predetermined time by skipping frames from the first image frame group, comprising: a first motion vector calculation unit which determines a first motion vector, which is a motion vector between one image frame of the second image frame group and an image frame immediately before this one image frame; a second motion vector calculation unit which determines, as a second motion vector, a motion vector between one image frame of the second image frame group and an image frame which is n frames before this one image frame; and a detection unit which detects that the second image frame group has been obtained from the first image frame group by the frame conversion when the ratio of the first motion vector and the second motion vector is in a range recognized as a predetermined ratio which is determined by the number of frames m and a frame skip pattern.

The object and advantage of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 26 is a diagram depicting a configuration example of an image display apparatus using the frame rate conversion apparatus in FIG. 23.

DESCRIPTION OF EMBODIMENTS

Modes for carrying out the present invention (hereafter called "embodiment") will be described with reference to the drawings. Configurations of the following embodiments are examples, and the present invention is not limited to the configurations of the embodiments.

<First Embodiment>

Figure 3:
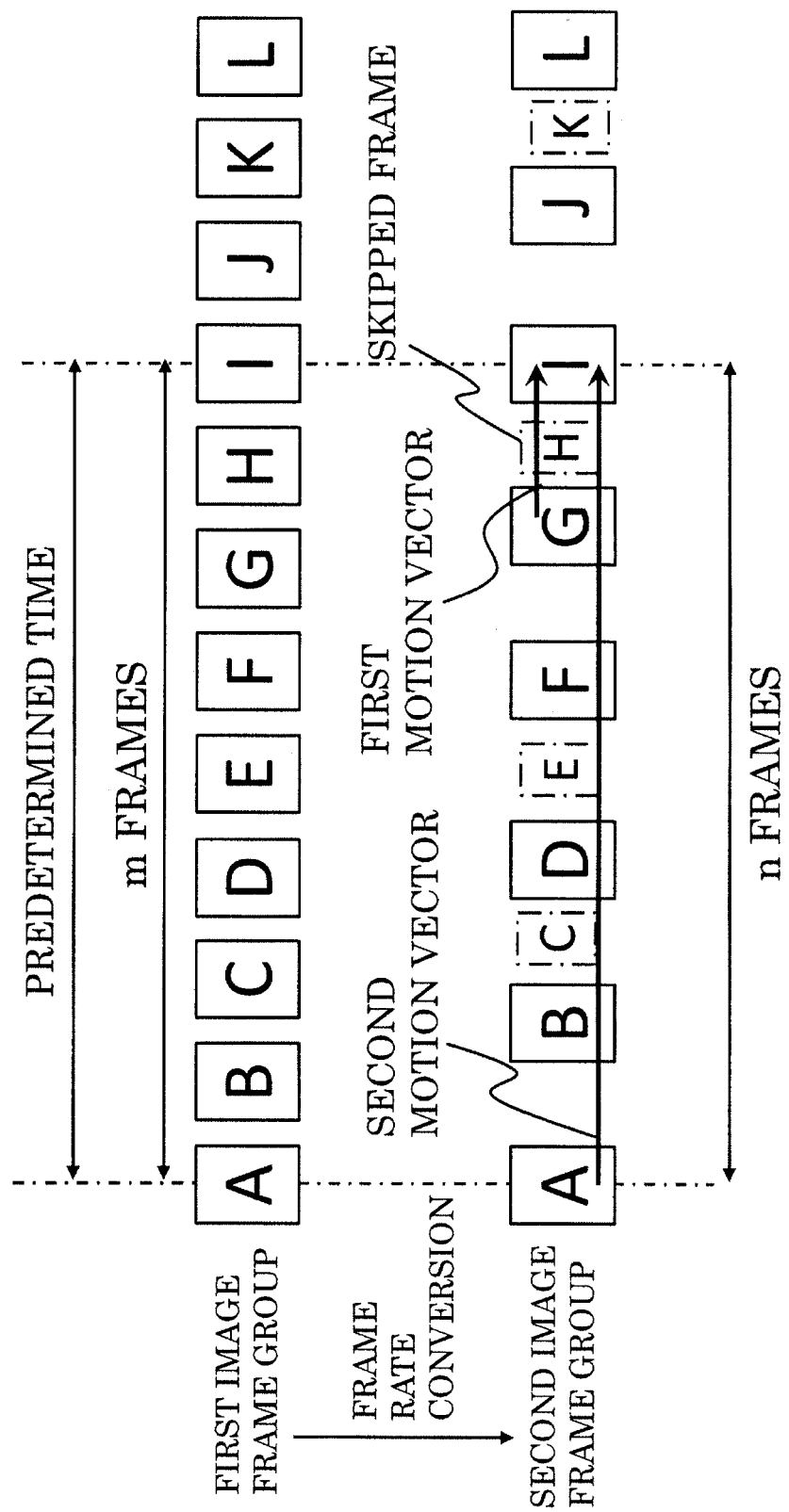
FIG. 3 is a diagram depicting an example of frame rate conversion from the first image frame group into the second image frame group.

FIG. 3 is a diagram depicting an example of frame rate conversion from a first image frame group to a second image frame group. m is the number of frames per predetermined time of a source rate. The second image frame group is generated by skipping frames from the first image frame group so that the frame rate is converted into n number of frames per same predetermined time. m and n are natural numbers, not including 0. m and n satisfy the relationship of n<m.

As FIG. 3 indicates, the second image frame group is generated by skipping frames from the first image frame group. For example, the image frames are skipped from m number of frames per predetermined time of the first image frame group, so as to generate the second image frame group of which number of frames per same predetermined time is n. In some cases, an original frame between one image frame of the second image frame group and the image frame immediately before this image frame in the second image frame group may be skipped. In other cases, one image frame of the second image frame group and the image frame immediately before this image frame in the second image frame group may be continuous in the first image frame group before frame rate conversion as well, without the original image frame being skipped.

For example, when the frame rate is converted from the first image frame group into the second image frame group, as illustrated in FIG. 3, an image frame H between an image frame I and an image frame G is skipped. On the other hand, when the frame rate is converted from the first image frame group into the second image frame group, no image is skipped between an image frame B and an image frame A immediately before the image frame B.

For example, a motion vector between one image frame of the second image frame group and an image frame which is immediately before this image frame in the second image frame group is defined as a first motion vector. For example, a motion vector between one image frame of the second image frame group and an image frame which is n frames before this image frame in the second image frame group is defined as a second motion vector.

If one image frame of the second image frame group is determined as the image frame I in FIG. 3, the first motion vector is a motion vector between the image frame I of the second image frame group and the image frame G which is immediately before the image frame I. The second motion vector is a motion vector between the image frame I of the second image frame group and the image frame A which is n frames before the image frame I.

In this case, the first motion vector is a motion vector the same as the motion vector between the image frame I of the first image frame group and the image frame G which is two frames before the image frame I in the first image frame group. The second motion vector is a motion vector the same as the motion vector between the image frame I of the first image frame group and the image frame A which is m frames before the image frame I in the first image frame group. The ratio of the first motion vector and the second motion vector, in this case, is given by the following Expression 1.

$$\text{First motion vector:second motion vector}=2{:}m \qquad \text{(Expression 1)}$$

If one image frame of the second image frame group is defined as the image frame I in FIG. 3, the image frame H to be skipped upon the frame rate conversion exists between the image frame I and the image frame G in the first image frame group. If one image frame of the second image frame group is defined as the image frame B in FIG. 3, on the other hand, there is no frame to be skipped upon the frame rate conversion between the image frame B and the image frame A.

Therefore if one image frame of the second image group is defined as the image frame B, the first motion vector is a motion vector the same as the motion vector between the image frame B of the first image frame group and the image frame A which is one frame before the image frame B in the first image frame group. The second motion vector is a motion vector the same as the motion vector between the image frame B of the first image frame group and the image frame (not illustrated) which is m frames before the image frame B in the first image group. The ratio of the first motion vector and the second motion vector, in this case, is given by the following Expression 2.

$$\text{First motion vector:second motion vector}=1{:}m \qquad \text{(Expression 2)}$$

By Expression 1 and Expression 2, it is known that the ratio of the first motion vector and the second motion vector is changed by the number of skipped frames between one image frame of the second image frame group and an image frame which is immediately before this image frame in the second image frame group. In other words, the ratio of the first motion vector and the second motion vector is determined by the number of frames m per predetermined time of the first image frame group and a skipping pattern between frames upon the frame conversion.

Actually the ratio of the first motion vector and the second motion vector does not satisfy Expression 1 and Expression 2, since the motion vector is an estimated value. Therefore a predetermined numerical range for allowing an error in Expression 1 and Expression 2 is set. If the ratio of the first motion vector and the second motion vector is in a range recognized as a predetermined ratio, determined by the number of frames m per predetermined time of the first image frame group and a skip pattern among frames, then it can be detected that the second image frame group has been obtained from the first image frame group by the frame rate conversion.

Figure 4:
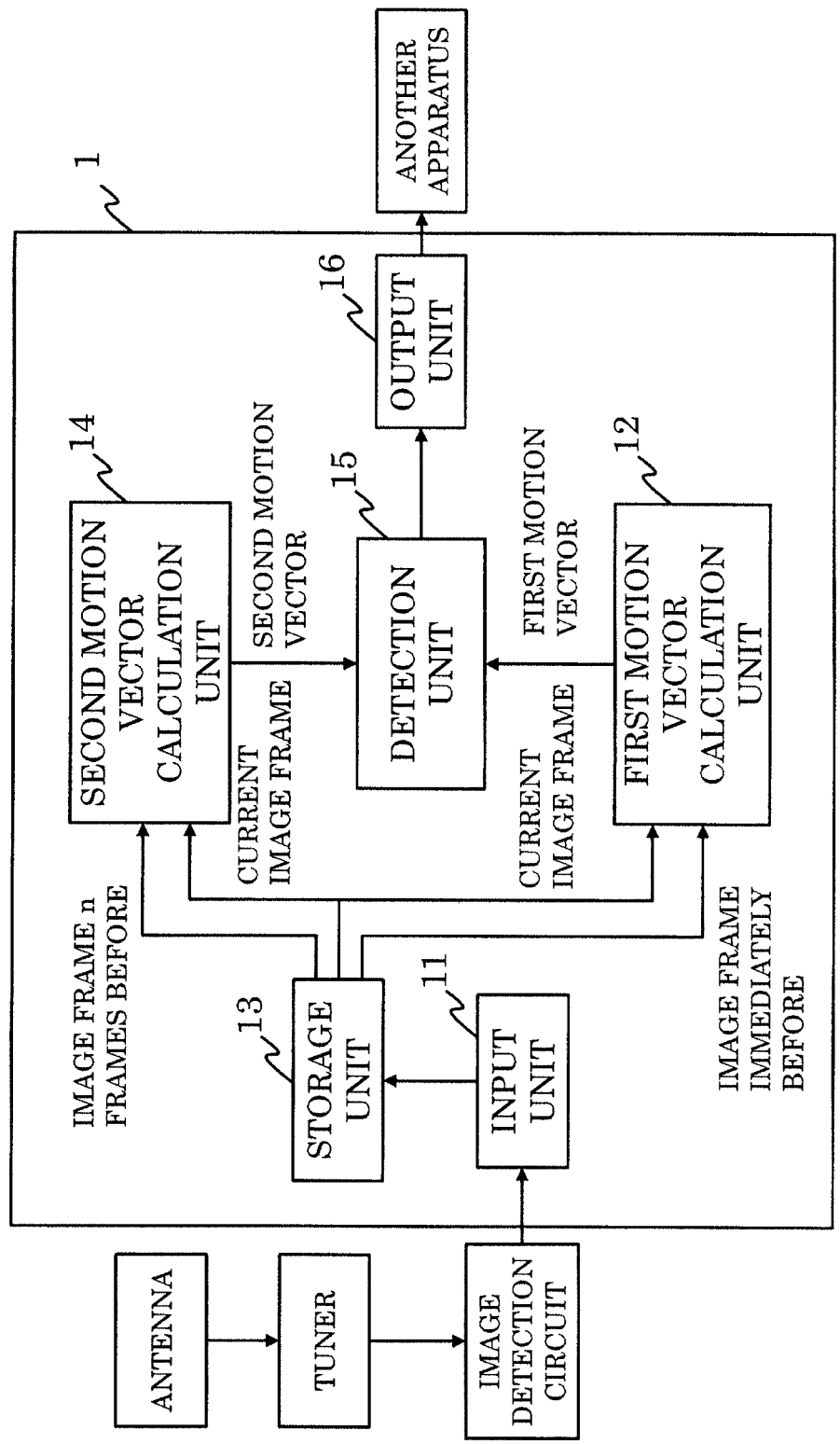
FIG. 4 is a diagram depicting a configuration example of an information processing apparatus.

FIG. 4 is a diagram depicting a configuration example of an information processing apparatus. The information processing apparatus 1 includes an input unit 11, a storage unit 13, a first motion vector calculation unit 12, a second motion vector calculation unit 14, a detection unit 15 and an output unit 16.

The input unit 11 receives image signals of the second image frame group as input. Concerning these image signals, the image detection circuit extracts only image signals out of the input signals received via an antenna and a tuner, for example, and inputs the image signals to the input unit 11. The input unit 11 converts the image signal into a format of signals that can be handled by the information processing apparatus 1, that is the image frames of the second image frame group, and outputs the converted image signals to the storage unit 13.

The storage unit 13 receives the image frames of the second image frame group from the input unit 11 as input. The storage unit 13 stores the image frames for a predetermined time, and then outputs the image frames. The storage unit 13 outputs one image frame of the second image frame group (hereafter called "current image frame") and an image frame which is one frame before this frame in the second image frame group to the first motion vector calculation unit 12. The storage unit 13 outputs the current image frame and an image frame which is n frames before this frame in the second image frame group to the second motion vector calculation unit 14.

The first motion vector calculation unit 12 receives the current image frame and the image frame which is one frame before the current image frame as input. The first motion vector calculation unit 12 determines a motion vector between the current image frame and the image frame which is one frame before the current image frame as a first motion vector. The first motion vector calculation unit 12 outputs the first motion vector to the detection unit 15.

The second motion vector calculation unit 14 receives the current image frame and an image frame which is n frames before the current image frame as input. The second motion vector calculation unit 14 determines a motion vector between the current image frame and the image frame which is n frames before the current image frame as a second motion vector. The second motion vector calculation unit 14 outputs the second motion vector to the detection unit 15.

The detection unit 15 receives the first motion vector from the first motion vector calculation unit 12 and the second motion vector from the second motion vector calculation unit 14 as input. The detection unit 15 determines whether the ratio of the first motion vector and the second motion vector is in a range recognized as a predetermined ratio that is determined by the number of frames m per predetermined time of the first image frame group and a skip pattern among frames. In the case of FIG. 3, for example, it is determined whether the ratio of the first motion vector and the second motion vector is in a predetermined range which satisfies either Expression 1 or Expression 2. If the ratio of the first motion vector and the second motion vector is in a range recognized as a predetermined ratio that is determined by the number of frames m per predetermined time of the first image frame group and the skip pattern among frames, the detection unit 15 detects that the second image frame group has been obtained from the first image frame group by the frame rate conversion. The detection unit 15 outputs the detection result to the output unit 16.

The output unit 16 receives the detection result from the detection unit 15 as input. The output unit 16 converts the detection result into transmittable signals, and outputs the signals. For example, the output unit 16 outputs the detection result to another apparatus.

The image processing apparatus 1 determines a first motion vector from one image frame of the second image frame group and an image frame which is immediately before this image frame in the second image frame group. The information processing apparatus 1 determines a second motion vector between one image frame of the second image frame group and an image frame which is n frames before this image frame in the second image frame group. The information processing apparatus 1 determines whether the ratio of the first motion vector and the second motion vector is in a range recognized as a predetermined ratio determined by the number of frames m per predetermined time of the first image frame group and a skip pattern among frames. By this determination result, the image processing apparatus 1 can detect that the second image frame group has been obtained from the first image frame group by the frame rate conversion.

<Second Embodiment>

Now as a second embodiment of the image processing apparatus, an image processing apparatus which performs frame interpolation processing for a frame sequence, of which source rate is 24 fps and an input rate is 15 fps, will be described. The source rate is a frame rate when an image frame group is captured (generated). The input rate is a frame rate when the image frame group is input to the information processing apparatus. An image frame may simply be called a "frame".

Figure 2:
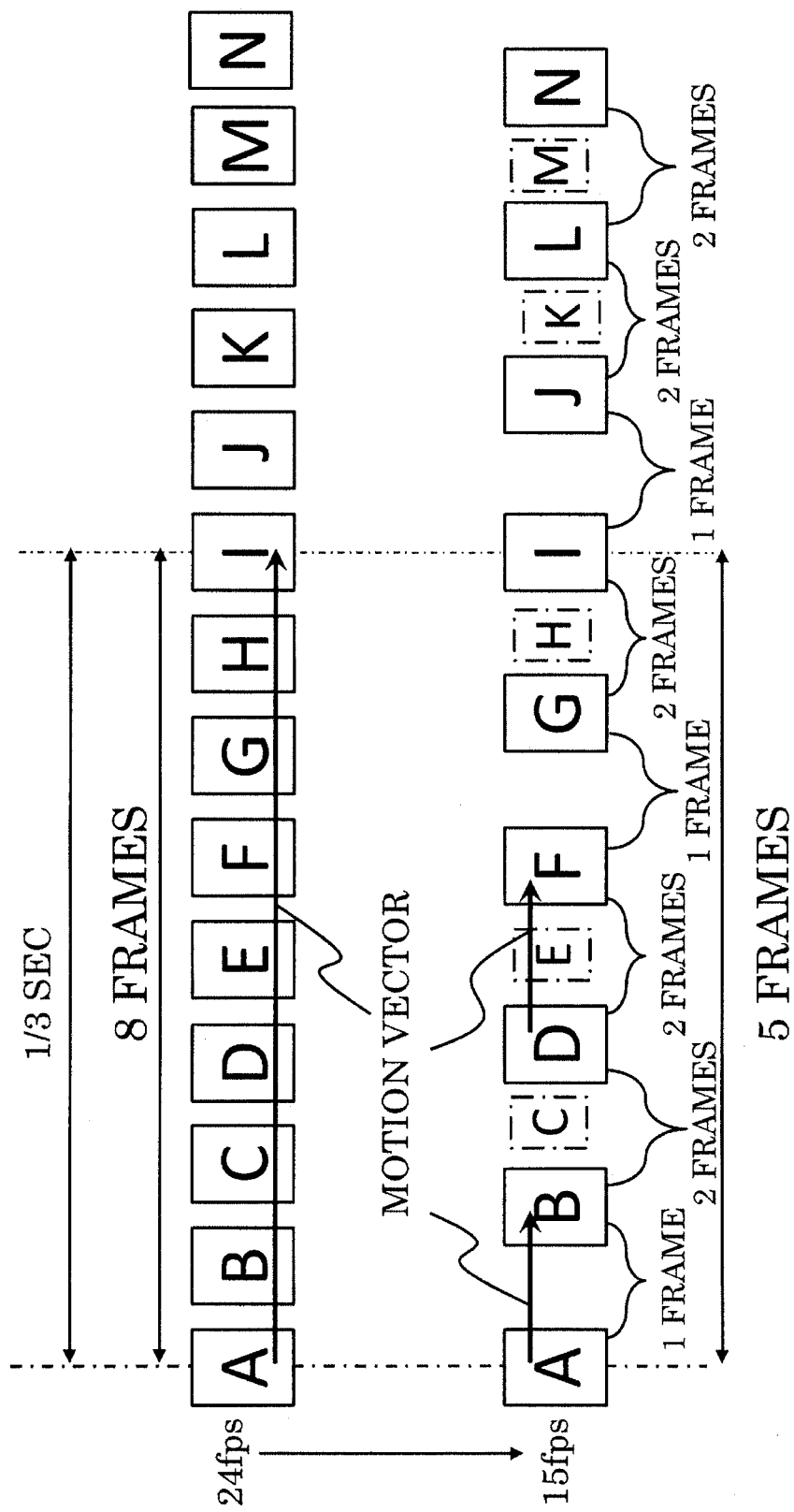
FIG. 2 is a diagram depicting an example of converting the frame rate 24 fps into the frame rate 15 fps.

An image frame group at the input rate 15 fps is generated, for example, by skipping three frames every eight frames of the 24 fps image frame group, as illustrated in FIG. 2. Therefore a motion vector between a current frame in the 15 fps image frame group and a frame which is five frames before the current frame in the 15 fps image frame group is equivalent to a motion vector between a current frame in the 24 fps image frame group and a frame which is eight frames before the current frame in the 24 fps image frame group.

A motion vector between a current frame of the 15 fps image frame group and a frame which is one frame before the current frame in the 15 fps image frame group, on the other hand, is equivalent to a current frame of the 24 fps image frame group and a frame which is one frame or two frames before the current frame in the 24 fps image frame group.

In other words, in some cases a frame immediately before the current frame of the 24 fps image frame group may also become a frame immediately before the current frame of the 15 fps (in the case when the frame was not skipped). Also in some cases, a frame which is two frames before the current frame of the 24 fps image frame group may become a frame immediately before the current frame of the 15 fps (in the case when the frame was skipped).

Therefore the motion vector between the current frame of the 15 fps image frame group and a frame immediately before the current frame becomes ⅛ (if not skipped) or ¼ (if skipped) of the motion vector between the current frame of the 15 fps image frame group and a frame which is five frames before the current frame in the 15 fps image frame group. For example, in the case of FIG. 2, the motion vector between the image frame I and the image frame G of the 15 fps image frame group becomes ¼ of the motion vector between the image frame I and the image frame A of the 15 fps frame group.

Actually the motion vector between the current frame of the 15 fps image frame group and the frame immediately before the current frame in the 15 fps image frame group does not becomes ⅛ or ¼ of the current frame of the image frame group of the 15 fps image frame group and the frame which is five frames before the current frame in the 15 fps image frame group, since the motion vector is an estimated value. In other words, an error is generated. Therefore a numerical range where an error is allowed is set. First, the motion vector between the current frame of the 15 fps image frame group and the frame which is five frames before the current frame in the 15 fps image frame group is multiplied by ⅛ or ¼. Then from this result, the motion vector between the current frame of the 15 fps image frame group and the frame immediately before the current frame in the 15 fps image frame group is subtracted, and if this result is within a predetermined numerical range, it can be detected that the 15 fps image frame group has been obtained from the 24 fps image frame group by the frame rate conversion.

Figure 5:
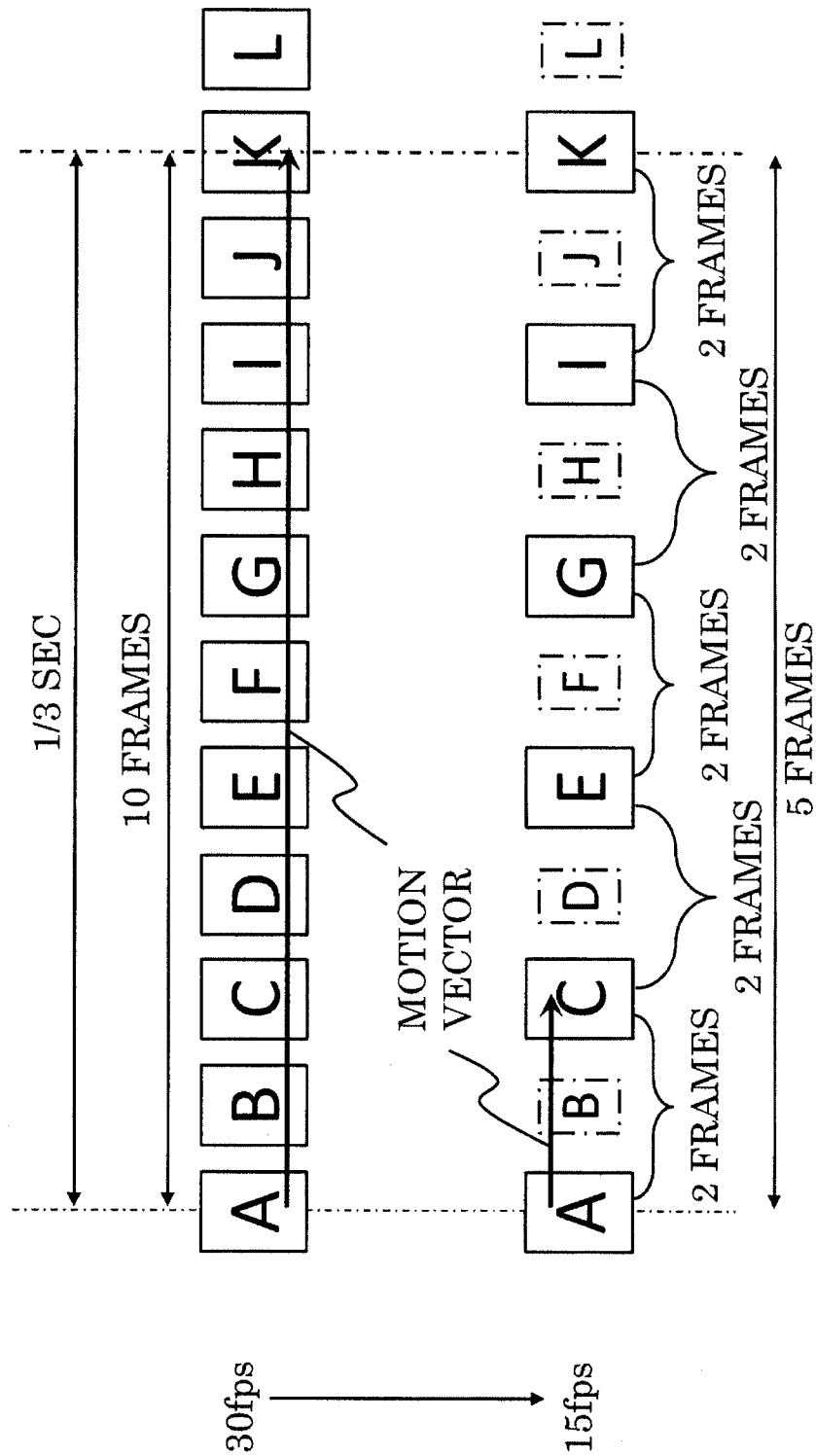
FIG. 5 is a diagram depicting an example of converting an image of which source rate is 30 fps into an image of which input rate is 15 fps.

FIG. 5 is a diagram depicting an example of converting the image frame group of which source rate is 30 fps into an image frame group of which the input rate 15 fps. In the case of converting the moving images of which source rate is 30 fps into moving images of which input rate is 15 fps, one frame is skipped every two frames, for example.

In this case, a motion vector between a current frame of the 15 fps image frame group and a frame which is five frames before the current frame in the 15 fps image frame group is equivalent to a motion vector between a current frame of the 30 fps image frame group and a frame which is ten frames before the current frame in the 30 fps image frame group. On the other hand, a motion vector between the current frame of the 15 fps image frame group and a frame which is one frame before the current frame in the 15 fps image frame group is equivalent to a motion vector between a current frame of the 30 fps image frame group and a frame which is two frames before the current frame in the 30 fps image frame group.

For example, in the case of FIG. 5, the frame J is skipped between the frame K of the 15 fps image frame group and the image frame I which is immediately before the frame K in the 15 fps image frame group when the frame rate conversion is performed. Hence a motion vector between the frame K and the frame I of the 15 fps image frame group is a motion vector having two frames of the 30 fps image frame group. A motion vector between the frame K and the frame A of the 15 fps image frame group is a motion vector having ten frames of the 30 fps image frame group.

Therefore in the case of obtaining the 15 fps image frame group from the 30 fps image frame group by the frame rate conversion, the motion vector between a current frame of the 15 fps image frame group and a frame which is immediately before the current frame in the 15 fps image frame group becomes ⅕ of the motion vector between the current frame and a frame which is five frames before the current frame in the 15 fps image frame group. In other words, the motion vector between the current frame of the 15 fps image frame group and the frame which is immediately before the current frame in the 15 fps image frame group is equivalent to two frames of the 30 fps image frame group. Therefore in the case of FIG. 5, the motion vector between the current frame of the 15 fps image frame group and the frame which is immediately before the current frame in the 15 fps image frame group does not become ¼ or ⅛ of the motion vector between the current frame and the frame which is five frames before the current frame in the 15 fps image frame group.

As described above, the 15 fps image frame group generated by converting the frame rate of the image frame group of which source rate is 30 fps (60i) according to NTSC, and the 15 fps image frame group generated by converting the frame rate of the 24 fps image frame group, can be distinguished by the inspection of the motion vector described above.

Figure 6:
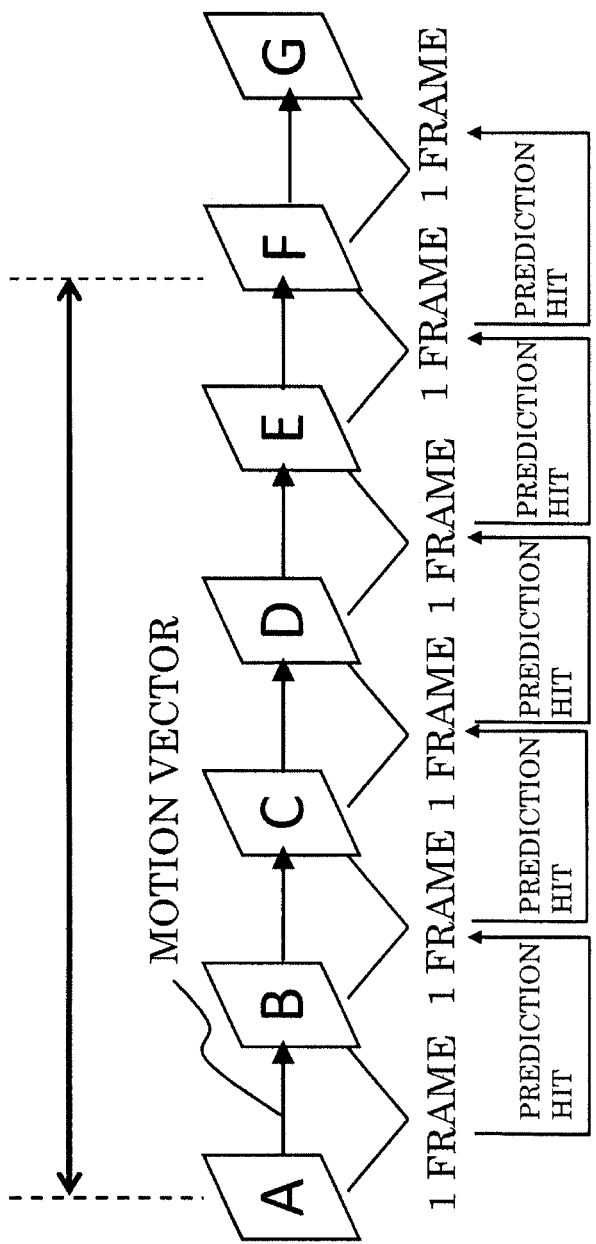
FIG. 6 is a diagram depicting an example when the source rate and the input rate are the same, and the motion vector is determined by feedback of the predicted vector.

FIG. 6 is a diagram depicting a case when the source rate and the input rate are the same, and a motion vector is determined by feedback of a predicted vector. As FIG. 6 illustrates, if the source rate and the input rate are the same, there are no frames to be skipped since no frame conversion processing is performed. In other words, in the case of FIG. 6, the frame time interval in the source rate is the same in the motion vector between the frame A and the frame B, and in the motion vector between the frame B and the frame C.

A motion vector between a frame which is immediately before the current frame and a frame which is two frames before the current frame is fed back as the predicted vector. In this case, the frame time interval of the motion vector to be determined and the frame time interval of the predicted vector to be fed back are the same. Hence if the motion vector between the frame A and the frame B is fed back as a predicted vector upon calculating a motion vector between the frame B and the frame C, as illustrated in FIG. 6, a more accurate motion vector can be determined.

FIG. 6 illustrates a case when the source rate and the input rate are a same value. In the same manner, even in the case of obtaining the 15 fps image frame group from the 30 fps image frame group by the frame rate conversion, the time interval between frames of the 15 fps image frame group becomes even. Therefore even in the case of obtaining the 15 fps image frame group from the 30 fps image frame group by the frame rate conversion, a motion vector between a frame which is immediately before the current frame of the 15 fps image frame group and a frame which is two frames before this frame which is immediately before the current frame is fed back as a predicted vector.

Figure 7:
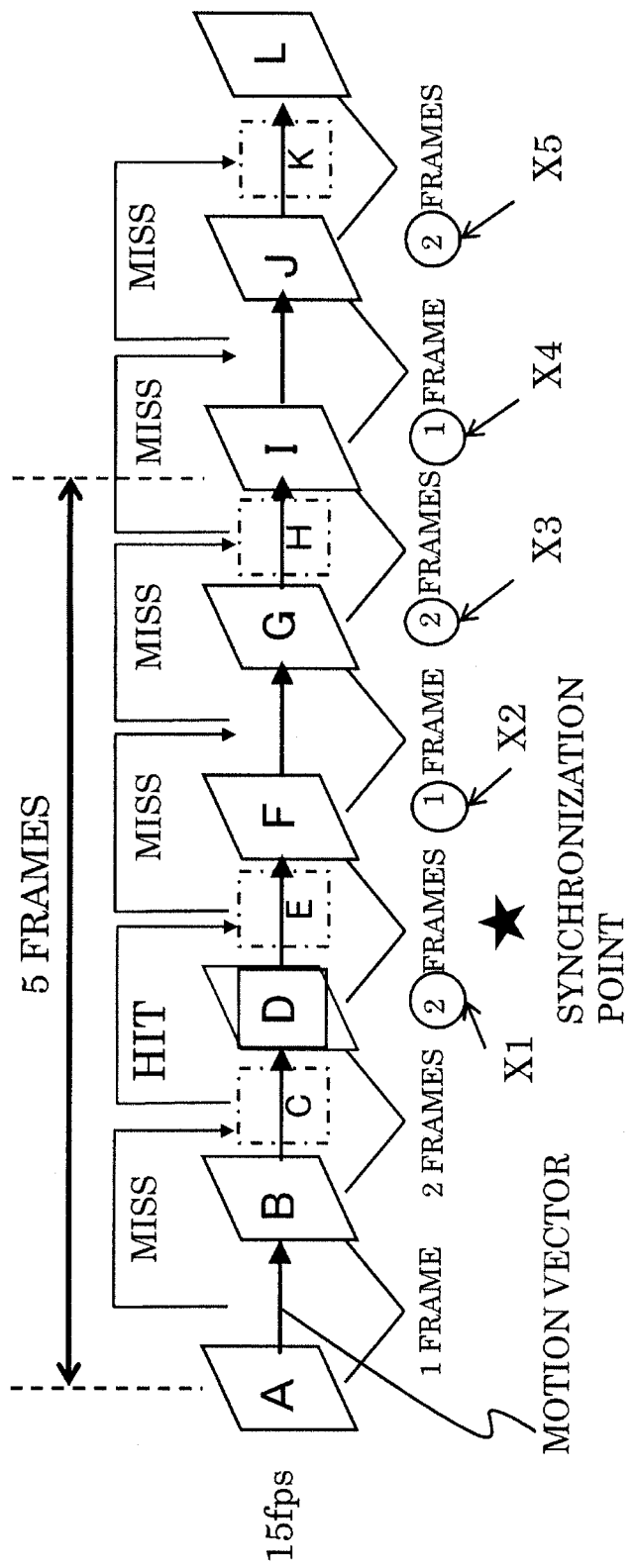
FIG. 7 is a diagram depicting an example of determining a motion vector by feedback of the predicted vector when the source rate is 24 fps and the input rate is 15 fps.

FIG. 7 is a diagram depicting an example of determining a motion vector by feeding back a predicted vector in the case when the source rate is 24 fps and the input rate is 15 fps.

In the case when the source rate is 24 fps and the input rate is 15 fps, one frame is skipped every three frames or one frame is skipped every two frames upon the frame rate conversion. Therefore in FIG. 7, for example, the frame time interval at the source rate 24 fps is different between the motion vector between the frame A and the frame B and the motion vector between the frame B and the frame D. The motion vector between the frame A and the frame B is a motion vector equivalent to one frame time (1/24 seconds) at the source rate 24 fps. Whereas the motion vector between the frame B and the frame D is a motion vector equivalent to two frame time (1/12 seconds) at the source rate 24 fps.

Therefore in the case of calculating the motion vector between the frame B and the frame D by feedback of the motion vector between the frame A and the frame B as a predicted vector, the predicted vector does not function effectively because of the difference of the frame time intervals at 24 fps. In other words, the motion vector between the frame B and the frame D is not determined correctly, and the accuracy of the motion vector drops.

As illustrated in FIG. 7, the frame skip pattern upon the frame rate conversion from 24 fps into 15 fps among frames of the 15 fps image frame group, when the frame A is regarded as a base point, is {1 frame, 2 frames, 2 frames, 1 frame, 2 frames}. In this sequence, a frame is skipped upon the frame rate conversion from 24 fps into 15 fps in the case of "2 frames". During this sequence, there is only once when the frame time, at the source rate 24 fps of the motion vector as a predicted vector, and that of the motion vector to be a calculated, match.

In FIG. 7, the frame time between the frame B and the frame D at the source rate 24 fps and the frame time between the frame D and the frame F at 24 fps are both two frame time (1/12 seconds) at 24 fps. If the motion vector between the frame B and the frame D is fed back as a predicted vector to determine the motion vector between the frame D and the frame F, the frame time intervals thereof match. Therefore if the motion vector between the frame B and the frame D is fed back as a predicted vector and the motion vector between the frame D and the frame F is determined, the motion vector can be determined more accurately than the case of determining the motion vector without feed back of the predicted vector. The case when the frame time interval of the motion vector as a predicted vector is equal to the frame time interval of the motion vector to be calculated like this is called a "synchronization point", and is indicated by a star in FIG. 7. Regarding the frame F in FIG. 7, where the synchronization point is detected, as a start point, the sequence of the frame time intervals with the previous frame is defined as the skip sequence Xn={X1, X2, X3, X4, X5}={2, 1, 2}. The skip sequence Xn is also called a "skip pattern" performed upon the frame rate conversion.

FIG. 7 is an example when m=8 and n=5 in the first embodiment. It is assumed that a motion vector between a current frame of the 15 fps image frame group and a frame that is immediately before the current frame in the 15 fps image frame group corresponds to the first motion vector according to the first embodiment. A motion vector between the current frame of the 15 fps image frame group and the frame which is five frames before the current frame in the 15 fps image frame group corresponds to the second motion vector according to the first embodiment.

Therefore in the example illustrated in FIG. 7, the first motion vector is supposed to be ⅛ (corresponds to one frame) or ¼ (corresponds to two frames) of the second motion vector. In other words, a point that the first motion vector becomes ¼ of the second motion vector is supposed to appear a plurality of times every five frames of the 15 fps image frame group.

However the frame time at the source rate 24 fps of the motion vector as a predicted vector and that of the motion vector to be calculated are different in points other than the synchronization points, hence values of the motion vectors to be calculated disperse. Due to this, a point where the first motion vector becomes ¼ of the second motion vector in the second embodiment by feedback of the predicted vector is limited to the synchronization points.

As a result, according to the second embodiment, the synchronization points can be detected by detecting the first motion vector becoming ¼ of the second motion vector, and a start point of the skip sequence Xn can be specified.

In the skip sequence Xn of the frames, Xn=1 indicates that there is no skipped frame between the current frame and the frame which is immediately before the current frame. In other words, it is unnecessary to interpolate a frame between the current frame and the frame which is immediately before the current frame. Xn=2 indicates that one frame is skipped between the current frame and the frame which is immediately before the current frame. In other words, it is necessary to interpolate a frame between the current frame and the frame which is immediately before the current frame. This means that by specifying a start point X1 of the skip sequence Xn, it can be determined whether or not a frame should be interpolated between the current frame and the frame which is immediately before the current frame.

In order to increase an accuracy of an interpolation frame, it is critical to determine motion vectors accurately. To further accurately determine motion vectors, a predicted vector to be fed back is controlled. A multiplier to control the predicted vector for further accurately determining motion vectors is assumed to be a predicted vector control multiplier αn.

Figure 8:
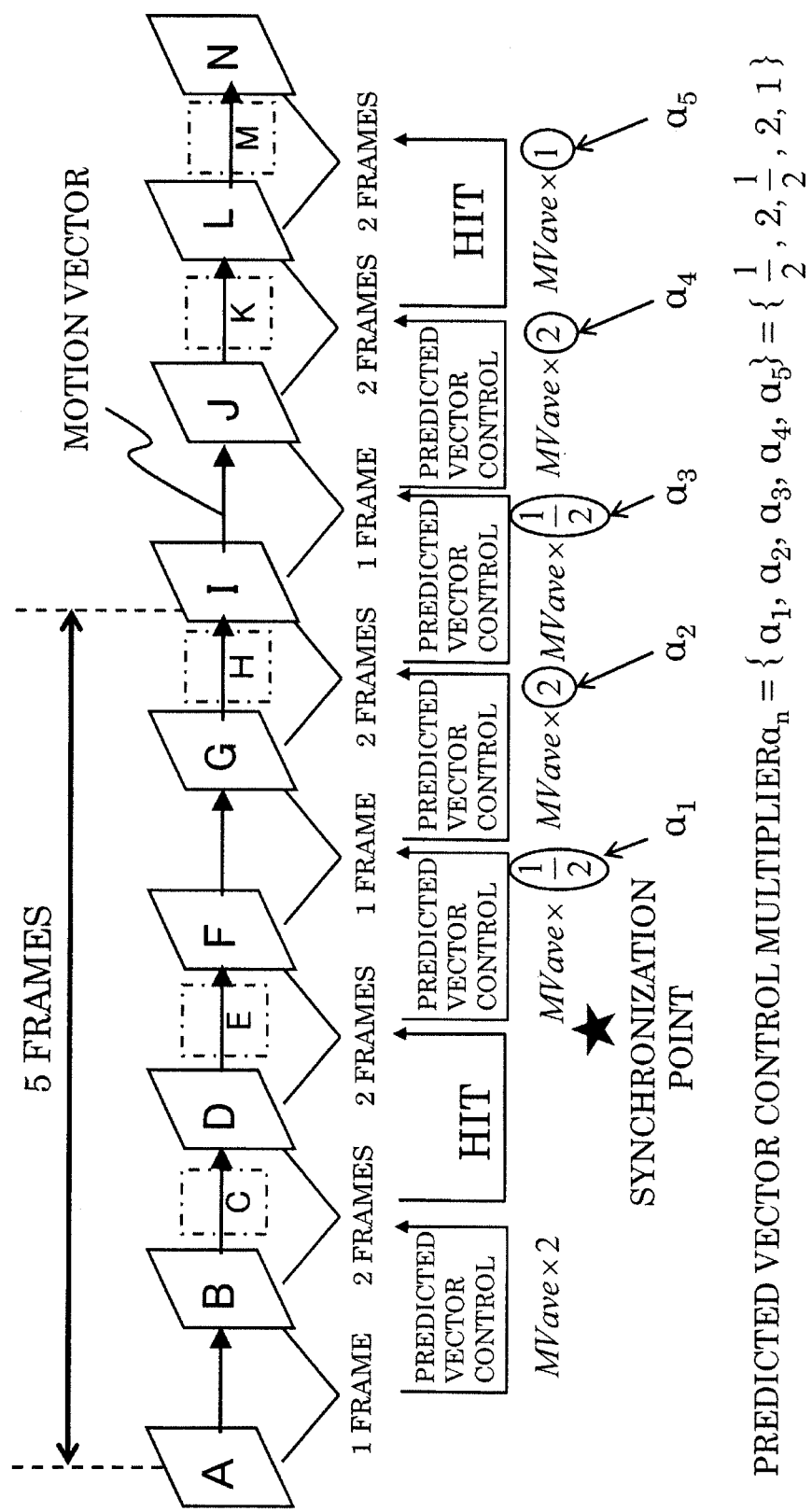
FIG. 8 is a diagram depicting a predicted vector control multiplier αn.

FIG. 8 is a diagram depicting the predicted vector control multiplier αn. FIG. 8 illustrates an example when a moving image of which source rate is 24 fps is converted into a moving image of which input rate is 15 fps, just like FIG. 7.

If the moving image of which source rate 24 fps is converted into the moving image of which input rate is 15 fps and input, the frame time interval between a frame and a frame at the source rate 24 fps is different from one another, as described in FIG. 7. Therefore by making a frame time interval at 24 fps uniform between a motion vector of a frame which is immediately before the current frame and a frame that is two frames before the current frame, as a predicted vector, and a motion vector between the current frame and a frame which is immediately before the current frame at 24 fps, a more effective predicted vector can be fed back.

In FIG. 8, the frame time interval of the motion vector between the frame A and the frame B at the source rate 24 fps, for example, is equivalent to one frame (1/24 seconds). The frame time interval at the source rate 24 fps of the frame B and the frame ID, to which the motion vector between the frame A and the frame B is fed back, is equivalent to two frames (1/12 seconds). Therefore by multiplying the motion vector between the frame A and the frame B as a predicted vector by 2, this frame time interval is made uniform with the frame time interval at the source rate 24 fps of the motion vector between the frame B and the frame D. In other words, the motion vector between the frame A and the frame B is multiplied by the ratio of the frame time at 24 fps of the motion vector between the frame B and the frame D to the frame time at 24 fps of the motion vector between the frame A and the frame B.

If the same procedure is performed for the other frames, a sequence {½, 2, ½, 2, 1} is obtained with a synchronization point (indicated by a start symbol) as a start point. This sequence determines the predicted vector control multiplier αn. In other words, the predicted vector control multiplier αn is a ratio of the frame time of the motion vector between the current frame and a frame which is immediately before the current frame to the frame time of the motion vector between the frame which is immediately before the current frame and a frame which is two frames before the current frame.

Thus the synchronization point can be detected by the first motion vector and the second motion vector in the second embodiment. If the synchronization point is detected, the predicted vector control multiplier αn is specified along with the skip sequence Xn of the frames. By specifying the skip sequence Xn of the frames and the predicted vector control multiplier αn, it can be determined whether or not frame interpolation is executed, and the predicted vector can be determined.

<<Configuration Example of Image Processing Apparatus>>

Figure 9:
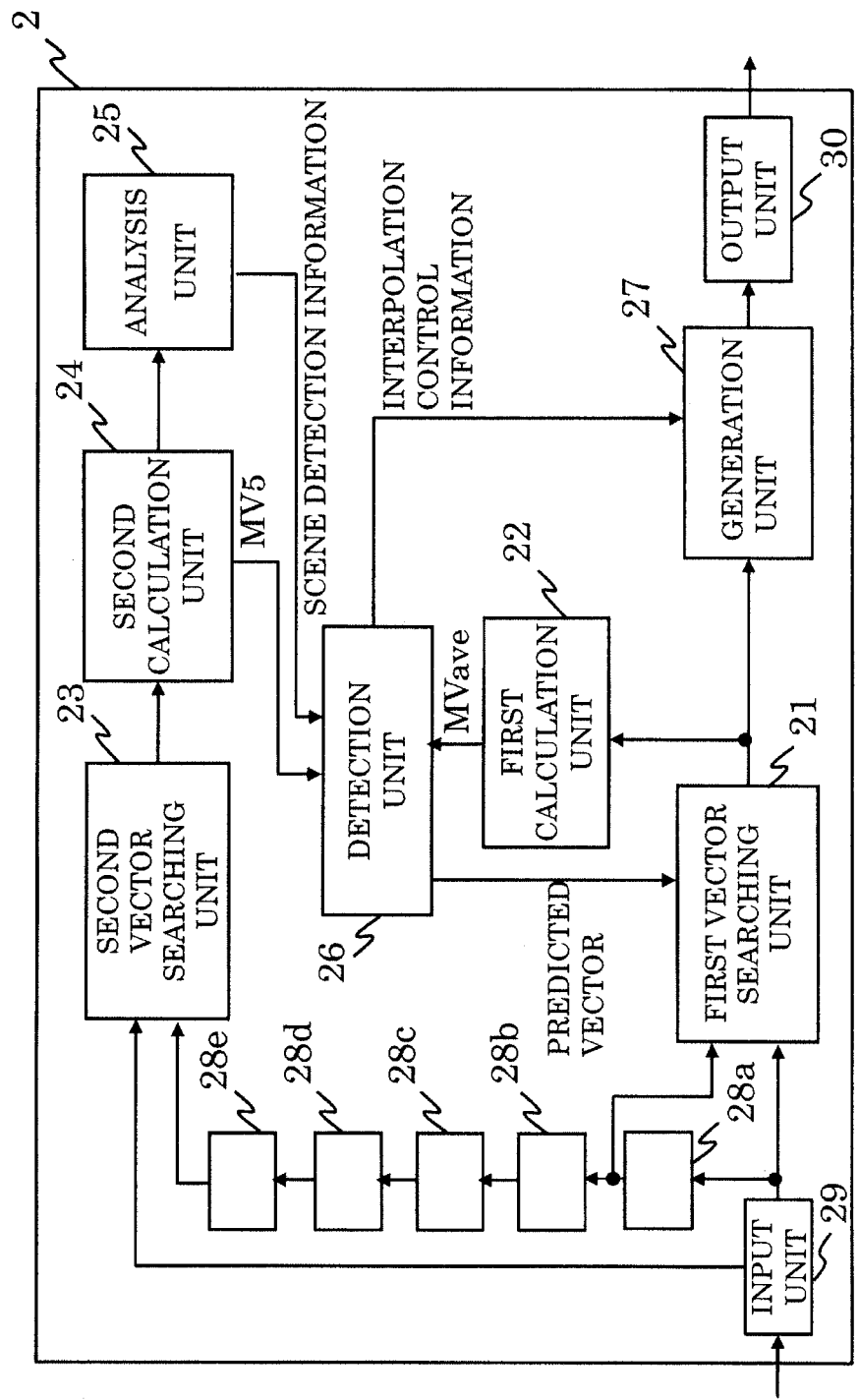
FIG. 9 is a diagram depicting a configuration example of the information processing apparatus.

FIG. 9 is a diagram depicting a configuration example of a second embodiment of the information processing apparatus. The information processing apparatus 2 includes an input unit 29, a first vector searching unit 21, a first calculation unit 22, a second vector searching unit 23, a second calculation unit 24, an analysis unit 25, a detection unit 26, a generation unit 27, buffers 28a to 28e, and an output unit 30. The information processing apparatus 2 may also be called "frame interpolation apparatus 2" herein below.

The input unit 29 receives image signals of a 15 fps image frame group as input. Concerning the image signals, the image detection circuit (not illustrated) extracts only image signals out of the input signals received via an antenna and a tuner (not illustrated), for example, and inputs the image signals to the input unit 29. The input unit 29 converts the image signals into a format of signals handled by the information processing apparatus 2, that is, the image frames of the 15 fps image frame group, and outputs the converted image signals to the buffer 28a, the first vector searching unit 21 and the second vector searching unit 23. The input unit 29 also receives a 15 fps image frame group from another apparatus (not illustrated) as input, and outputs the image frame group to the buffer 28a, the first vector searching unit 21 and the second vector searching unit 23.

The buffer 28a receives the 15 fps image frames as input. If the next frame is input to the buffer 28a, the buffer 28a outputs frames which have been stored in the buffer 28b and the first vector searching unit 21. The frames stored in the buffer 28b are sequentially output to the buffer 28c, buffer 28d and buffer 28e every time a frame is input. The frames stored in the buffer 28e are sequentially output to the second vector searching unit 23 when a frame is input to the buffer 28a. Thus the buffers 28a to 28e exhibit FIFO (First In, First Out) functions, which can store five frames except that the output from the buffer 28a is also output to the first vector searching unit 21.

In this way, a currently input frame and a frame which was input one frame before the current frame are input to the first vector searching unit 21. The currently input frame and a frame which was input five frames before the current frame, are input to the second vector searching unit 23.

The first vector searching unit 21 receives the current frame and a frame which is one frame before the current frame as input. The first vector searching unit 21 determines a motion vector between the current frame and a frame which was input one frame before the current frame. The motion vector is determined for each block, which is a set of pixels constituting a frame. Hereafter a block which is a set of pixels is simply called a "block". The first vector searching unit 21 outputs a calculated motion vector for each block to the first calculation unit 22 and the generation unit 27.

The first calculation unit 22 receives a motion vector for each block from the first vector searching unit 21 as input. The first calculation unit 22 averages motion vectors for each block calculated by the first vector searching unit 21 to calculate an average motion vector MVave. The first calculation unit 22 outputs the average motion vector MVave to the detection unit 26.

The second vector searching unit 23 receives the current frame and the frame which was input five frames before the current frame as input. The second vector searching unit 23 calculates a motion vector between the current frame and the frame which was input five frames before the current frame. The motion vector is determined for each block which is a set of pixels constituting a frame. The second vector searching unit 23 outputs the motion vector for each block to the second calculation unit 24.

The second calculation unit 24 receives the motion vector for each block from the second vector searching unit 23 as input. The second calculation unit 24 averages the motion vectors calculated by the second vector searching unit 23 to calculate the average motion vector MV5. The second calculation unit 24 outputs the average motion vector MV5 to the analysis unit 25 and the detection unit 26.

The first calculation unit 22 and the second calculation unit 24 calculate the average motion vector MVave and the average motion vector MV5, so that the detection unit 26 can handle the motion vector for each block in the frame as one motion vector. Performing the determination processing for the motion vector for each block makes the processing very complicated. If the motion vectors calculated for each block in the frame are averaged and handled as one motion vector, the processing load decreases. Even if the average motion vector MVave and the average motion vector MV5 generated by averaging the motion vectors for each block within the frame are used, the relationship described in FIG. 6 to FIG. 8 are established between the vectors.

The analysis unit 25 receives the average motion vector MV5 from the second calculation unit 24 as input. The analysis unit 25 determines whether the image scene is a predetermined specific scene based on the average motion vector MV5. The determination result is output to the detection unit 26 as the scene detection information.

The detection unit 26 receives the average motion vector MVave from the first calculation unit 22 as input. The detection unit 26 receives the average motion vector MV5 from the second calculation unit 24 as input. The detection unit 26 also receives the scene detection information from the analysis unit 25 as input.

Based on the average motion vector MVave and the average motion vector MV5, the detection unit 26 detects that the 15 fps image frame group is obtained from the 24 fps image frame group by the frame rate conversion.

If it is detected that the 15 fps image frame group has been obtained from the 24 fps image frame group by the frame rate conversion, the detection unit 26 generates interpolation control information to indicate whether or not frame interpolation is performed. The detection unit 26 calculates a predicted vector based on the detection result. In other words, the detection unit 26 calculates the interpolation control information and the predicted vector using the skip sequence Xn and the predicted vector control multiplier αn. The detection unit 26 outputs the interpolation control information to the generation unit 27. The detection unit 26 outputs the predicted vector to the first vector searching unit 21.

The generation unit 27 receives a motion vector for each block between the current frame and a frame which is one frame before the current frame from the first vector searching unit 21. The generation unit 27 also obtains the interpolation control information, to indicate whether or not interpolation is requested, from the detection unit 26 as input. If the interpolation control information includes information instructing to perform the frame interpolation, the generation unit 27 generates an intermediate frame between the current frame and a frame which was input one frame before the current frame. An intermediate frame is also called an "interpolation frame". The generation unit 27 outputs the generated interpolation frame.

The output unit 30 receives the interpolation frame as input. The output unit 30 converts the interpolation frame into image signals, if necessary, and outputs the image signals.

Details on the first vector searching unit 21, the first calculation unit 22, the second vector searching unit 23, the second calculation unit 24, the analysis unit 25, the detection unit 26 and the generation unit 27 will be described later.

<<Processing by First Vector Searching Unit and Second Vector Searching Unit>>

An example of a method for determining a motion vector which can be applied to the first vector searching unit 21 and the second vector searching unit 23 will be indicated below. The first vector searching unit 21 will be described first.

Figure 10:
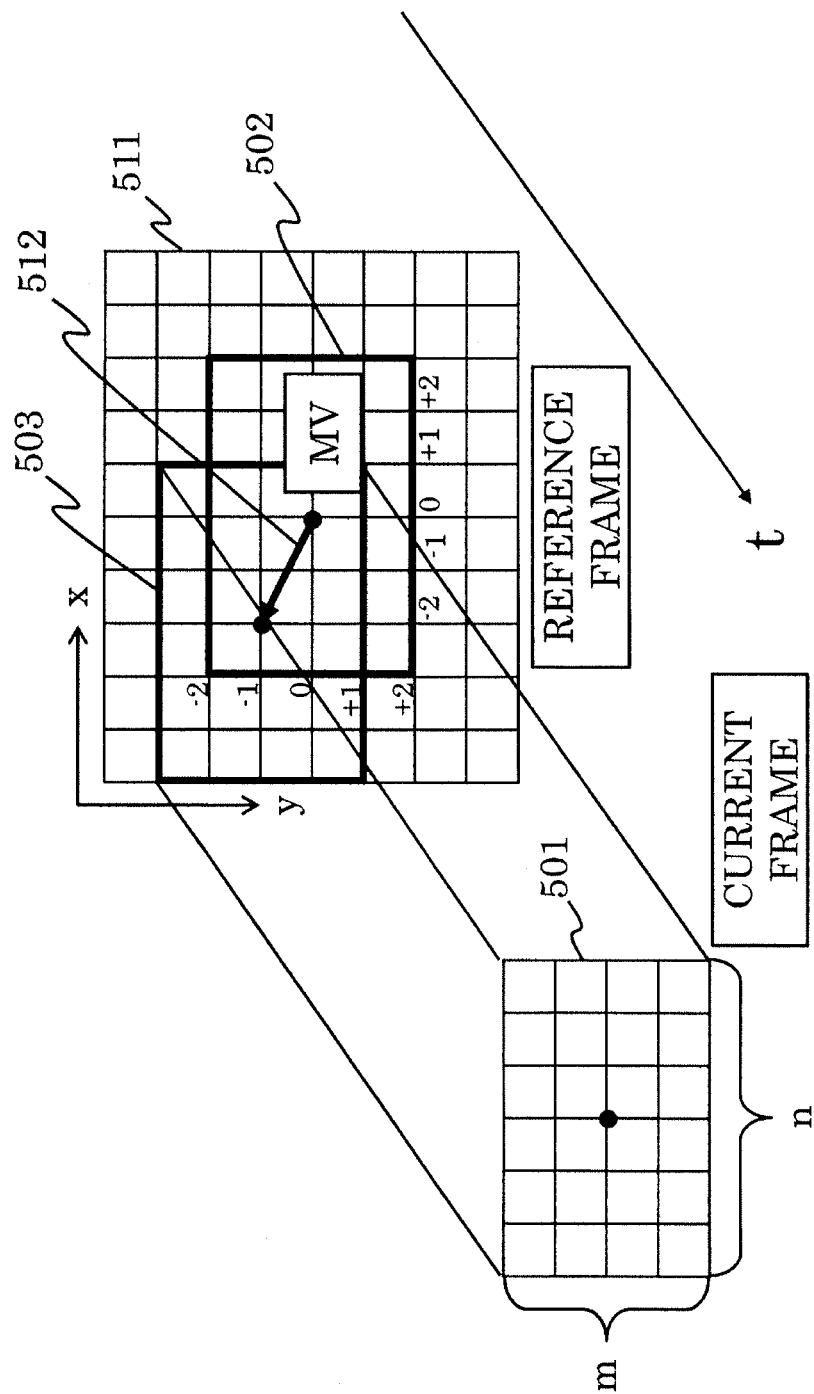
FIG. 10 is a diagram depicting an example of searching a motion vector.

FIG. 10 is a diagram depicting an example of a method for determining a motion vector. As a typical example of a method for determining a motion vector, FIG. 10 illustrates a motion vector searching by block matching.

For example, the first vector searching unit 21 performs pattern matching between a current frame and a reference frame 511 in a unit of pixel blocks called a "mask size", which has n pixels in the horizontal direction and m pixels in the vertical direction. FIG. 10 is an example using a mask size of n=6 and m=4, that is, six pixels in the horizontal direction and four pixels in the vertical direction, as a pixel block. Hereafter the pixel block is simply called a "block". The first vector searching unit 21 also uses a frame immediately before the current frame as a reference frame.

First the first vector searching unit 21 detects coordinates on the reference frame 511 corresponding to a center coordinates of a block 501 extracted from the current frame to be n×m. The first vector searching unit 21 detects the n×m block 502, centering around the coordinates detected on the reference frame 511.

In block 502, the first vector searching unit 21 searches a motion vector within a range of the horizontal direction±Sx pixels and the vertical direction±Sy pixels. In FIG. 10, the first vector searching unit 21 searches a motion vector in the range of the horizontal direction±2 and the vertical direction±2, regarding Sx=2 and Sy=2. In other words, if the origin is the center of the block 502 of the reference frame 511 corresponding to the block 501 of the current frame, the motion vector candidates MV are all the vectors existing in (x, y) (−Sx≤x≤+Sx, −Sy≤y≤+Sy). FIG. 10 indicates the state of pattern matching based on the motion vector candidates 512 of (−2, −1), out of the motion vector candidates MV. In FIG. 10, the first vector searching unit 21 adds position offsets based on the motion vector candidates 512 to the block 502. The first vector searching unit 21 determines a block 503 by shifting to block 502 in the reference frame 511 by −2 in the horizontal direction and by −1 in the vertical direction, and executes pattern matching between the pixels of the block 501 and those of the block 503.

Then the first vector searching unit 21 determines the similarity between the block 501 of the current frame and the block 503 of the reference frame 511. For all the pixels in the block 503, the first vector searching unit 21 calculates a sum of absolute differences with the corresponding pixels of the block 501. In this way, the first vector searching unit executes pattern matching for all the motion vector candidates MV of (x, y) (−Sx≤x≤+Sx, −Sy≤y≤+Sy). For all the blocks determined for all the motion vector candidates MV, the first vector search unit 21 calculates the sum of absolute differences with the pixels corresponding to the block 501, and determines a correlation value table configured by (2×Sx+1, 2×Sy+1).

Figure 11:
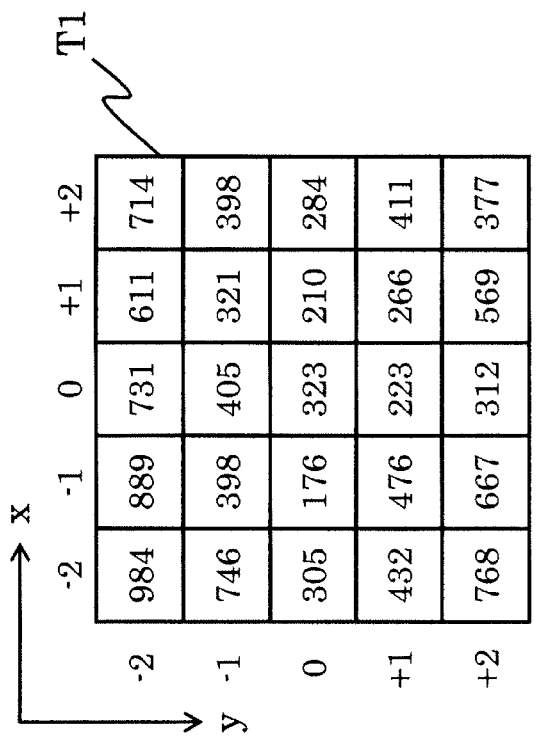
FIG. 11 is a diagram depicting an example of a correlation value table.

FIG. 11 is an example of the correlation value table between the block 501 and the reference frame 511. The correlation value table is also called "similarity table". The coordinates of the correlation value table T1 illustrated in FIG. 11 correspond to the x component and the y component of the motion vector candidate MV of the reference frame 511. For example, the similarity of the block 503 generated by offsetting the position of the motion vector candidate 512 by (−2, −1) in the x component and the y component and the block 501 in the current frame illustrated in FIG. 10 is 746, which is stored in the coordinates (−2, −1) of the correlation value table T1.

Figure 12:
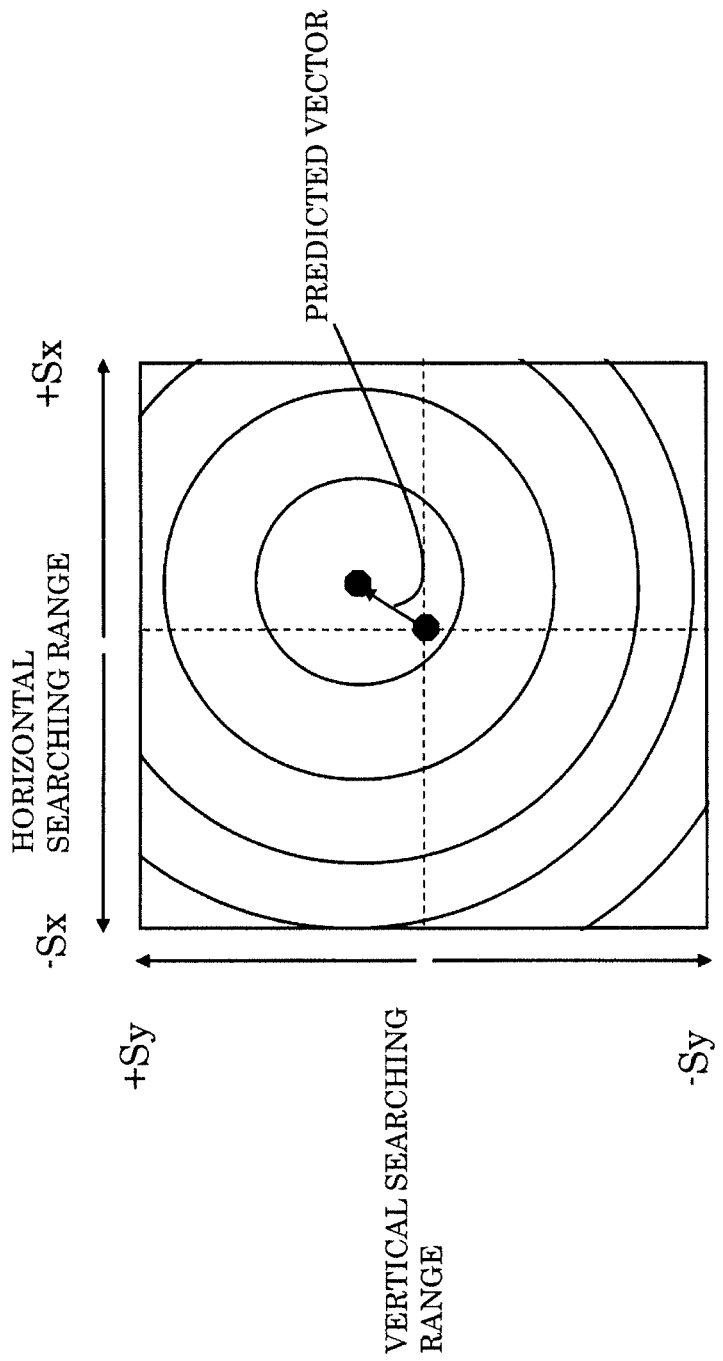
FIG. 12 is a diagram depicting an example of weight distribution when weighting is performed for motion vector candidates.

FIG. 12 is a diagram depicting an example of weight distribution upon weighting the motion vector candidate MV obtained by the block matching in FIG. 10. The concentric circles in FIG. 12 indicate the weights (costs) added according to the distance. The concentric circles in FIG. 12 represent the contour lines of weights when a weight increases as it becomes distant from the center. The first vector searching unit 21 offsets the center of the concentric circles in the direction of the predicted vector, so that the area near the predicted vector can be more easily selected as the motion vector. For the predicted vector, the first vector searching unit 21 uses a predicted vector which is input from the detection unit 26.

Figure 13:
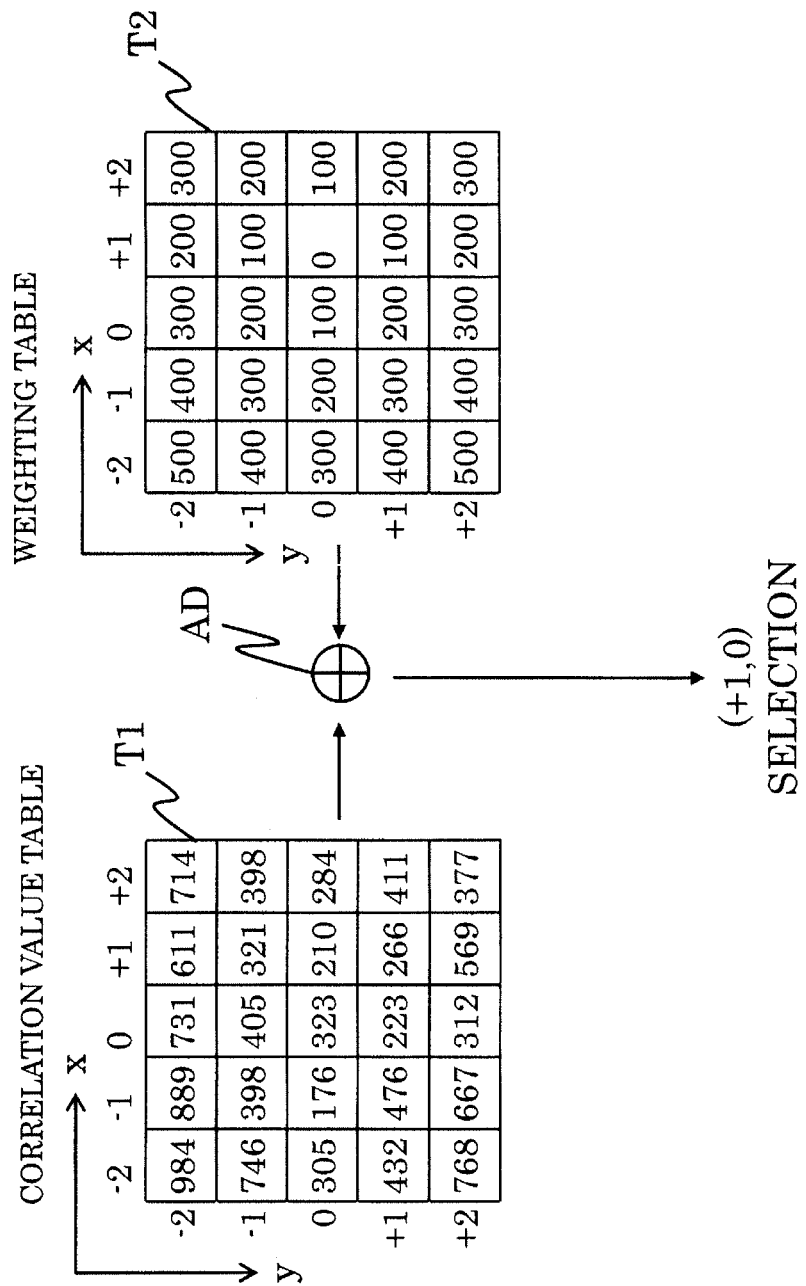
FIG. 13 is a diagram depicting an example of motion vector selection processing.

FIG. 13 is a diagram depicting an example of a motion vector selection processing in the block 501. FIG. 13 indicates a case when the predicted vector is (+1, 0).

The correlation value table T1 illustrated in FIG. 13 is a correlation value table similar to the correlation table illustrated in FIG. 11. In the weighting table T2, the center is offset to the predicted vector (+1, 0), and weighting is performed in each coordinate with the coordinates (+1, 0) as the center of the concentric circles.

The first vector searching unit 21 adds a corresponding coordinate value in the weighting table T2 to each coordinate of the correlation value table T1 by an adder AD, and selects the smallest coordinates as the motion vector of the block 501. In FIG. 13, smallest coordinates after adding the correlation value table T1 and the weighting table T2 are (+1, 0). In this case, the first vector searching unit 21 selects (+1, 0) for the motion vector of the block 501.

The first vector searching unit 21 determines motion vectors for blocks of the current frame other than the block 501 in the same manner as FIG. 10 to FIG. 13.

The second vector searching unit 23, on the other hand, uses a frame which is five frames before the current frame, as a reference frame. The second vector searching unit 23 may determine a motion vector in a same manner as the first vector searching unit 21. In this case, the second vector searching unit 23 may use a predicted vector calculated by the detection unit 26 as the predicted vector. The second vector searching unit 23 may also feed back the average motion vector MV5 calculated by the second calculation unit 24 to be used as the predicted vector.

The second vector searching unit 23 may also determine a motion vector as follows. Using a frame which is five frames before the current frame as the reference frame, the second vector searching unit 23 determines the correlation value table in the same manner as FIG. 10 and FIG. 11. The second vector searching unit 23 selects a smallest value in the correlation value table as a motion vector between the current frame and the frame which was input five frames before the current frame. In this case, if it is assumed that the second vector searching unit 23 determined the correlation value table T1 illustrated in FIG. 11, for example, 176 in the coordinates (−1, 0) is the smallest value, and (−1, 0) is selected as the motion vector of the block 501. The second vector searching unit 23 also determines a motion vector in the same manner for the other blocks in the current frame.

If the second vector searching unit 23 selects coordinates of the smallest value in the correlation value table as the motion vector (if the predicted vector is not used), a frame to be input may be reduced so as to determine the motion vector more accurately. This is because a motion vector determined by the second vector searching unit 23 does not influence the interpolation frames.

<<Processing by First Calculation Unit and Second Calculation Unit>>

The first calculation unit 22 determines the average motion vector MVave from the first motion vector calculated by the first vector searching unit 21. The second calculation unit 24 determines the average motion vector MV5 from the second motion vector calculated by the second vector searching unit 23.

Since the processing by the first calculation unit 22 and that by the second calculation unit 24 are the same, only a case of the first calculation unit 22 calculating the average motion vector MVave will be described.

Figure 14:
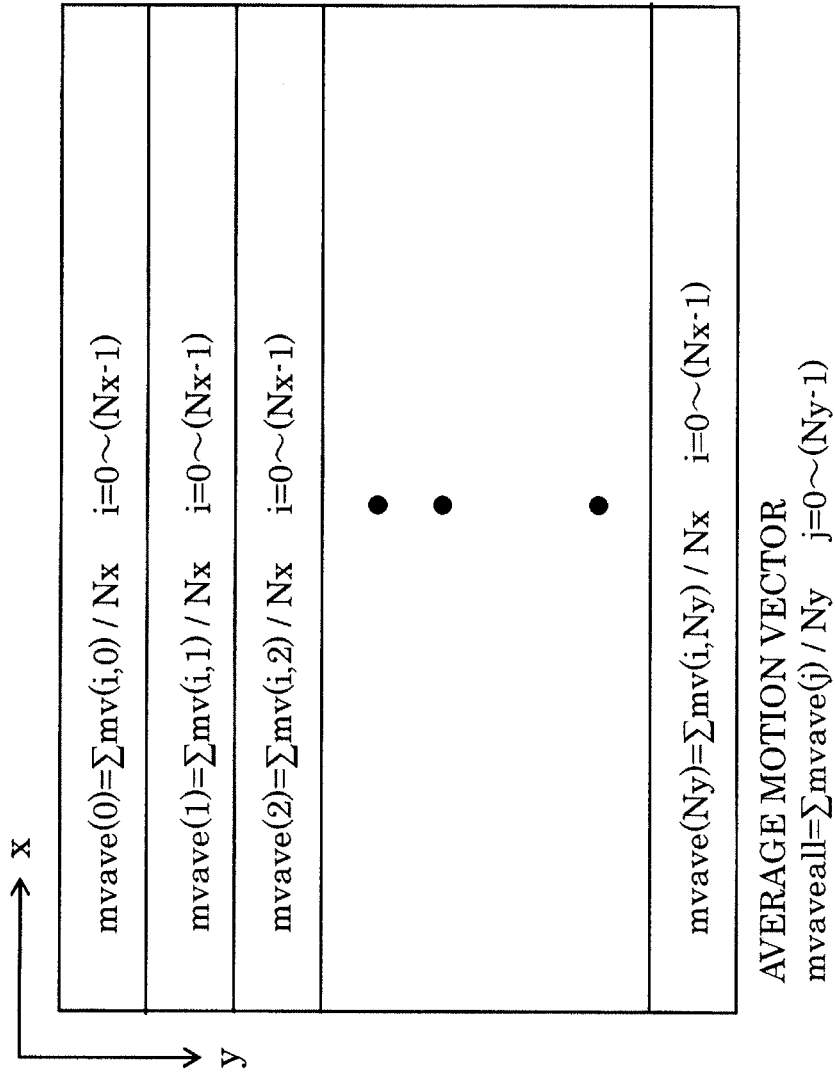
FIG. 14 is a diagram depicting an example of how to determine an average motion vector in a frame.

FIG. 14 is a diagram depicting an example of a method for determining an average motion vector in a frame. FIG. 14 illustrates a case when the frame is divided into Nx×Ny number of blocks, where the x axis is the horizontal direction and the y axis is the vertical direction of the frame. In other words, a motion vector in the block coordinates (i, j) is denoted by mv (i, j) (i=0, 1, ..., Nx−1, j=0, 1, ..., Ny−1). Nx and Ny indicate the number of blocks in the horizontal direction and the vertical direction respectively.

In the case of the example in FIG. 14, the first calculation unit 22 first calculates the average value mvave (j) of the Nx number of motion vectors mv (i, j) in the horizontal direction (x direction) for each line in the horizontal direction (x direction) according to the following Expression 3. The motion vector mV (i, j) is determined by the first vector searching unit 21.

$$mvave(j) = \frac{\sum_{i=0}^{Nx-1} mv(i, j)}{Nx} \quad (j = 0, 1, \ldots, Ny - 1) \quad \text{(Expression 3)}$$

Then the first calculation unit 22 calculates the average value of the provided Ny number of mvave (j) using the following Expression 4, and obtains mvaveall.

$$mvaveall = \frac{\sum_{j=0}^{Ny-1} mvave(j)}{Ny} \quad \text{(Expression 4)}$$

mvaveall determined by the first calculation unit 22 using Expression 4 is MVave. mvaveall determined by the second calculation unit 24 is MV5.

In FIG. 14, mvaveall is determined by vertically averaging the average motion vector mvave (j) for each line in the horizontal direction. Instead of this, the frame may be divided into a plurality of blocks in the vertical direction (y direction), so that mvall is determined by horizontally averaging the average motion vector mvave (i) for each line in the vertical direction.

<<Processing by Analysis Unit>>

The analysis unit 25 receives the average motion vector MV5 from the second calculation unit 24 as input, and analyzes whether the image scene is a predetermined specific scene.

An example of a specific scene is a scroll scene, such as pan and tilt of a camera. "Pan" means moving the lens horizontally while fixing the camera at one location. "Tilt" means moving the lens vertically while fixing the camera at one location. In the case of a scroll scene, such as pan and tile, where a predetermined movement continues, the influence of skipping frames, due to the conversion of the frame rate, is high. In other words, unnatural movement is sensed, so the movement may be corrected to be natural by the frame interpolation. A scroll scene can be detected by the directions of the vectors in the frame being aligned. Therefore the analysis unit 25 detects that the image scene is a specific scene, such as a scroll scene. The analysis unit 25 outputs scene detection information, based on the result of determining whether or not the image scene is a specific scene, to the detection unit 26.

An analysis unit 25 calculates a dispersion Δ of the motion vector by the following Expression 5 using an average motion vector MV5 calculated by the second calculation unit 24, for example.

$$\Delta = \sum_{j=0}^{Ny-1} |mvave(j) - mvaveall| \quad \text{(Expression 5)}$$

Using the product of the dispersion Δ and the magnitude of mvaveall as a determination value, the analysis unit 25 determines that the movement in the frame is uniform, that is, the image of the frame is a specific scene, if the determination value is small enough. Otherwise the analysis unit 25 determines that the image of the frame is not a specific scene. If a specific scene is detected, that is, if it is determined that the image of the frame is a specific scene, the analysis unit 25 sets the scene detection information to ON. Specifically, the analysis unit 25 sets the scene detection information to ON if the determination value is smaller than a predetermined threshold, and sets the scene detection information to OFF if the determination value is the threshold or more. The dispersion Δ itself may be used as the determination value. The analysis unit 25 outputs the scene detection information to the detection unit 26.

In Expression 5, the dispersion Δ is determined from the difference of the average values mvave (j) and mvaveall of the motion vectors mv (i, j) in the horizontal direction. Instead of mvave (j), the average value mvave (i) of the motion vector mv (i, j) in the vertical direction may be used. A sum of the dispersion determined from mvave (j) and dispersion determined from mvave (i) may be used as the dispersion A.

<<Processing by Detection Unit>>

The detection unit 26 detects whether or not the source rate is 24 fps based on the average motion vector MVave, average motion vector MV5 and scene detection information.

Figure 15:
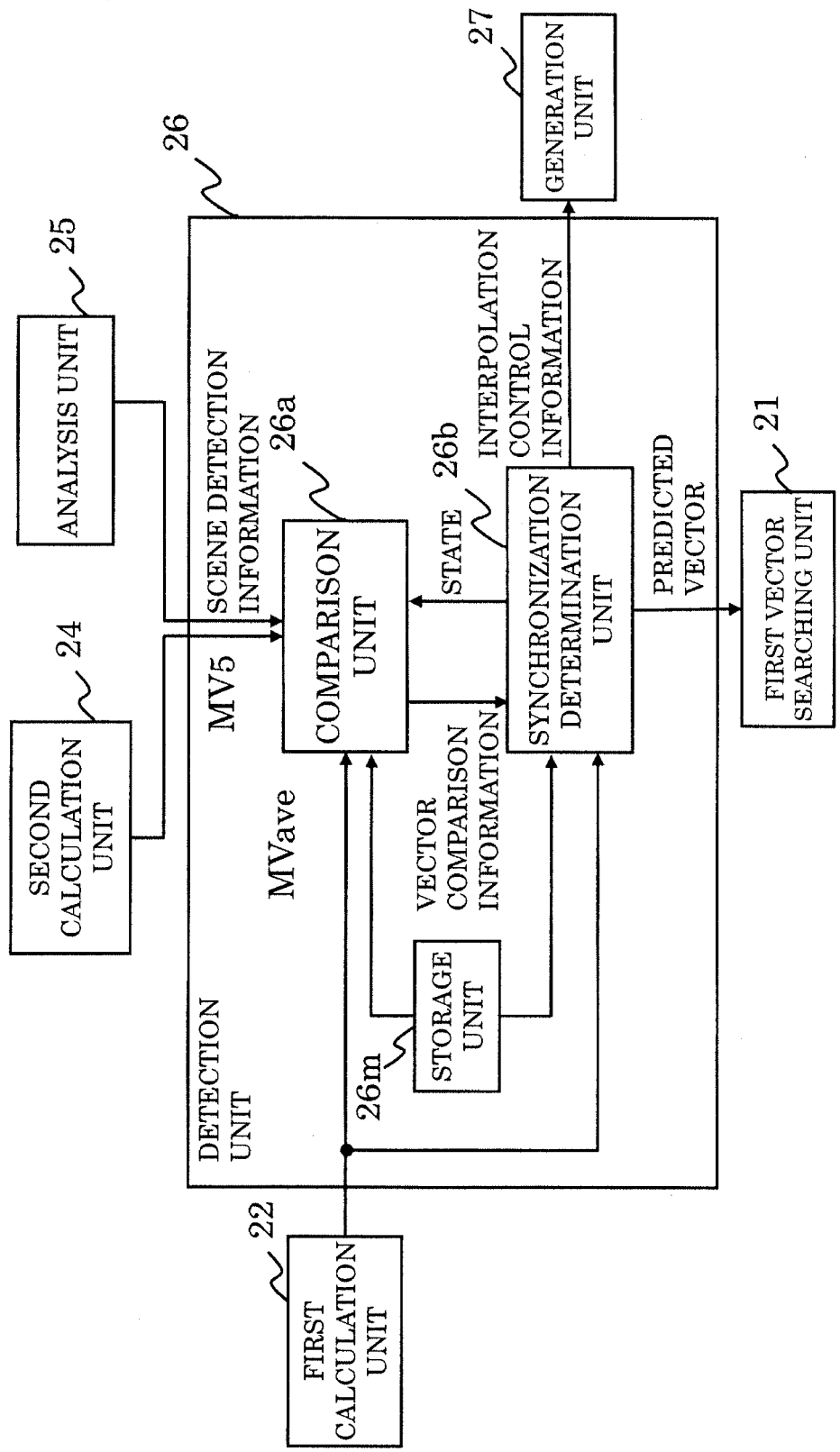
FIG. 15 is a diagram depicting a configuration example of a detection unit.

FIG. 15 is a diagram depicting a configuration example of the detection unit 26. The detection unit 26 has a comparison unit 26a, a synchronization determination unit 26b and a storage unit 26m.

In the storage unit 26m, a skip sequence Xn and a predicted vector control multiplier αn are stored. The storage unit 26m also stores information which is input from the comparison unit 26a and the synchronization determination unit 26b.

The comparison unit 26a receives the average motion vector MVave, the average motion vector MV5, the scene detection information and the synchronization state as input. The comparison unit 26a compares the average motion vector Mvave and the average motion vector MV5, and generates vector comparison information. The comparison unit 26a also stores the average motion vector MVave in the storage unit 26m temporarily. The comparison unit 26a outputs the vector comparison information to the synchronization determination unit 26b.

The synchronization determination unit 26b receives the vector comparison information from the comparison unit 26a as input. Based on the vector comparison information, the synchronization determination unit 26b determines whether the 15 fps image frame group has been obtained from the 24 fps image frame group by the frame rate conversion. The synchronization determination unit 26b also reads the average motion vector MVave and the predicted vector control multiplier αn, temporarily stored in the storage unit 26m, and calculates the predicted vector. The synchronization determination unit 26b also generates the interpolation control information to instruct whether or not the frame interpolation is performed.

The synchronization determination unit 26b outputs the determination result, whether or not the 15 fps image frame group has been obtained from the 24 fps image frame group by the frame rate conversion, to the comparison unit 26a. This determination result is called the "synchronization state". The synchronization determination unit 26b outputs the predicted vector to the first vector searching unit 21. The synchronization determination unit 26b also outputs the interpolation control information to the generation unit 27.

Figure 16:
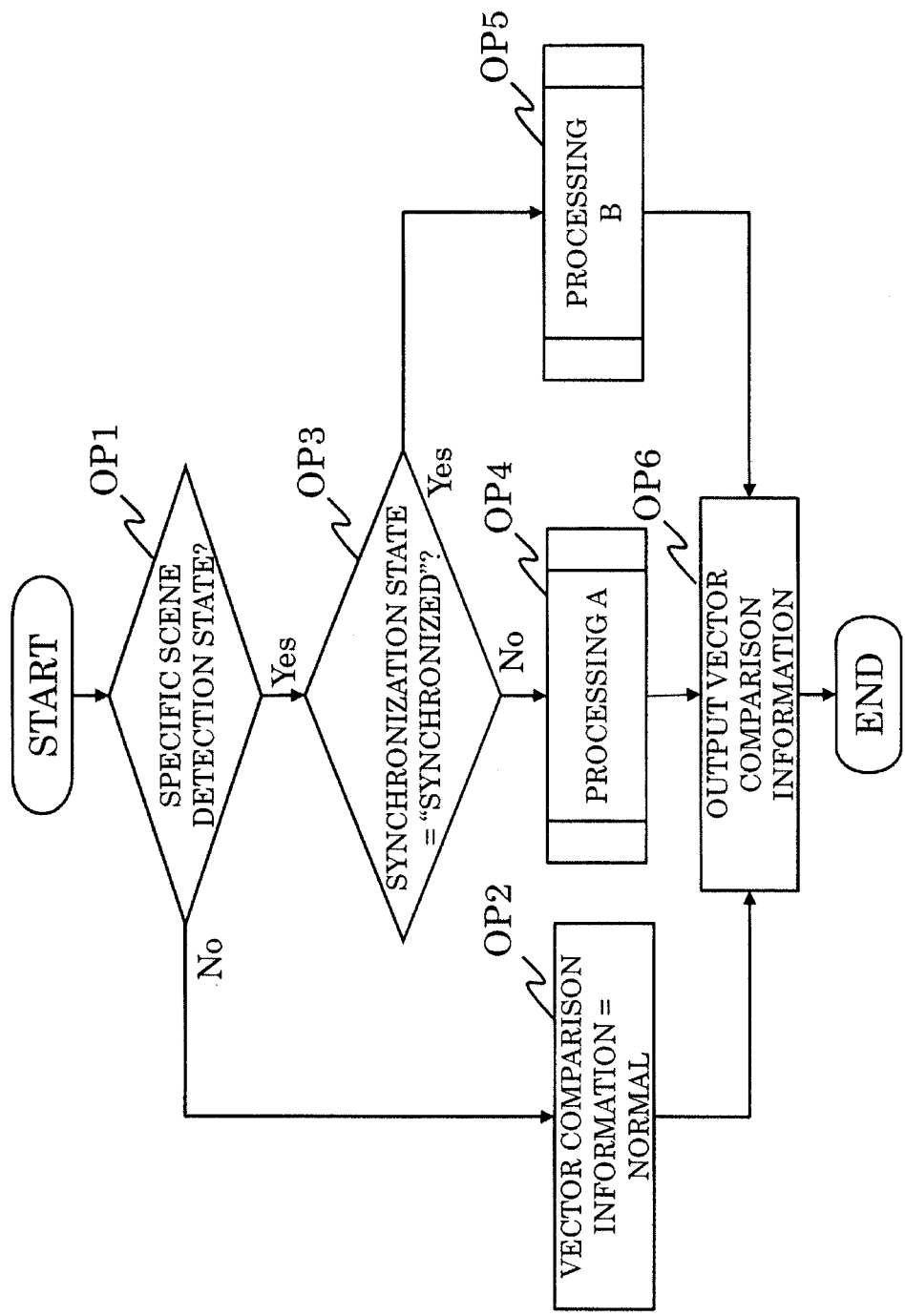
FIG. 16 is a flow chart depicting an example of processing by a comparison unit.
Figure 17:
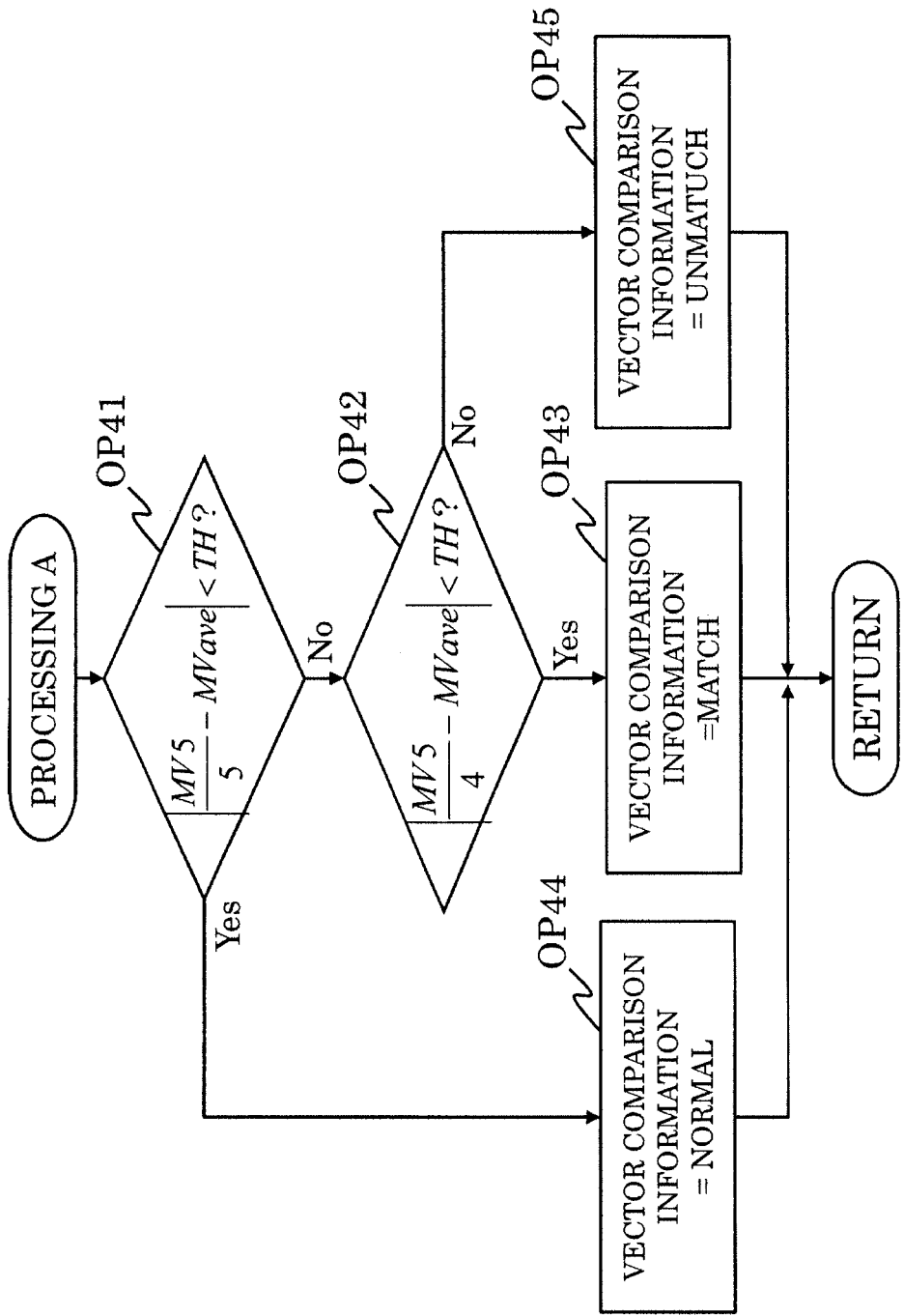
FIG. 17 is a flow chart depicting an example of processing by the comparison unit (sub-routine of processing A)
Figure 18:
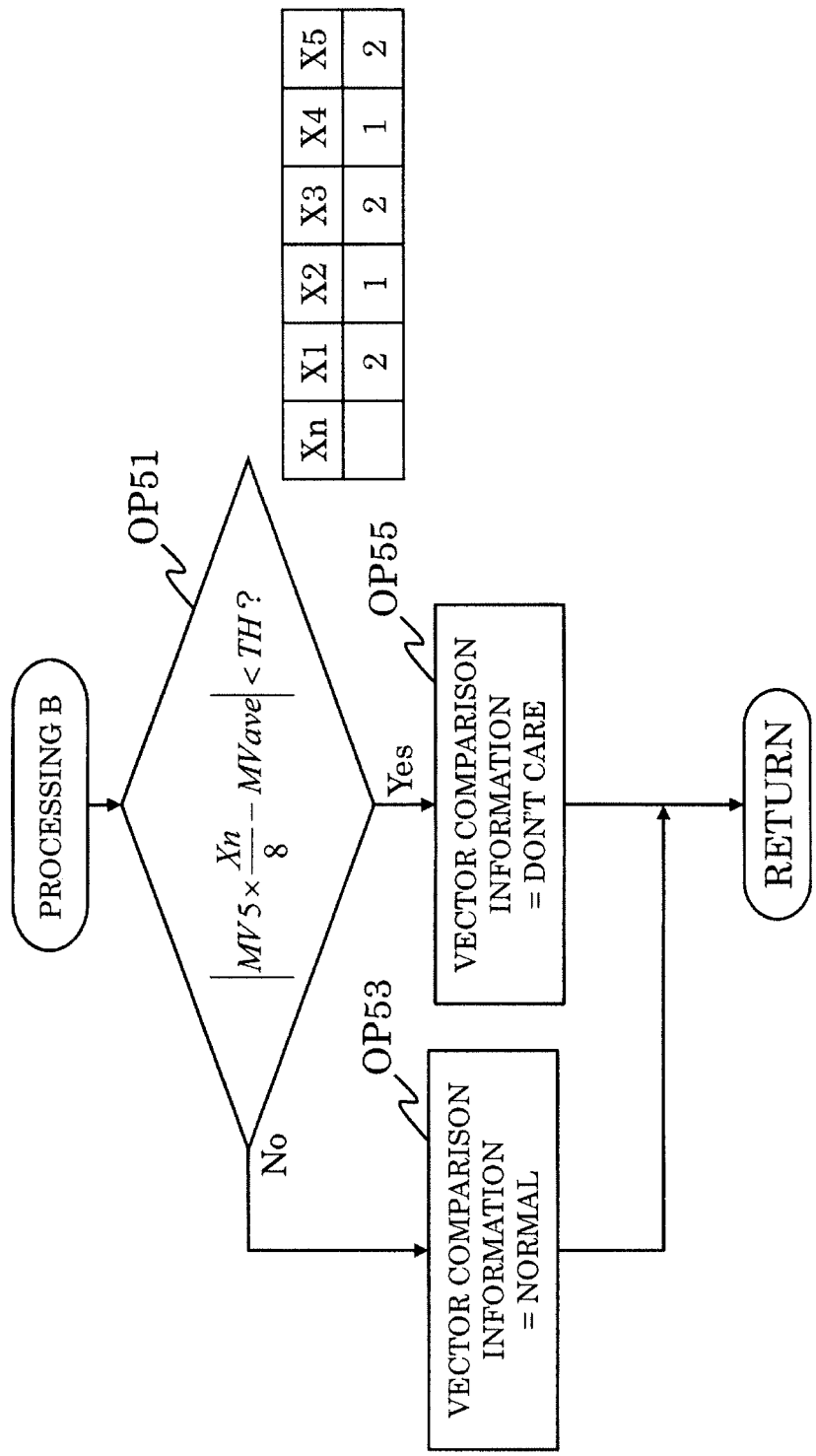
FIG. 18 is a flow chart depicting an example of processing by the comparison unit (sub-routine of processing B)

FIG. 16, FIG. 17 and FIG. 18 are flow charts depicting an example of the processing by the comparison unit 26a. If the average motion vector MVave, the average motion vector MV5 and the scene detection information are input, the comparison unit 26a starts processing. The processing in FIG. 16 to FIG. 18 is executed for each input frame. In other words, the comparison unit 26a executes the processing in FIG. 16 to FIG. 18 for each processing of the first calculation unit 22 and the second calculation unit 24 for the current frame.

The comparison unit 26a determines whether or not the moving image is a specific scene based on the scene detection information (OP1). In other words, if the scene detection information which was input from the analysis unit 25 is ON, the processing advances to OP3. If the scene detection information which is input from the analysis unit 25 is OFF, the processing advances to OP2.

If the moving image is not a specific scene, that is, if the scene detection information is OFF (OP1: NO), the comparison unit 26a generates "normal" as the vector comparison information (OP2). Then the comparison unit 26a outputs the vector comparison information to the synchronization determination unit 26b (OP6). The vector comparison information "normal" indicates an operation status that regards that the 15 fps image frame group has been obtained from the 30 fps image frame group by the frame rate conversion.

If the moving image is a specific scene, that is, if the scene detection information is ON (OP1: YES), the comparison unit 26a determines whether or not the synchronization state is "synchronized" (OP3). The synchronized state being "synchronized" (also called "synchronized state") means that it is detected that the 15 fps image frame group has been obtained from the 24 fps image frame group by the frame rate conversion. The synchronization state is determined by the synchronization determination unit 26b. The initial value of the synchronized state is "not synchronized". The synchronization state being "not synchronized" (also called "not synchronized" state) means that the 15 fps image frame group is not obtained from the 24 fps image frame group by the frame rate conversion. In other words, the "not synchronized" state indicates that the current operation is based on the assumption that the 15 fps image frame group has been obtained from the 30 fps image frame group by the frame rate conversion, which is the same as "normal" state, but the difference from "normal" state is that the synchronization state is totally denied.

If the synchronization state is "not synchronized" (OP3: NO), processing advances to OP4, and processing A, which is a processing in the case of "not synchronized" state, is executed (OP4). If the synchronization state is "synchronized" (OP3: YES), processing advances to OP5, and processing B, which is a processing in the case of the "synchronized state" is executed (OP5).

FIG. 17 indicates a flow chart of the processing A. The processing A is a processing by the comparison unit 26a in the case of the "not synchronized" state.

The comparison unit 26a determines whether or not the average motion vector MVave and the average motion vector MV5 satisfy the following Expression 6 (OP41).

$$\left|\frac{MV5}{5} - MVave\right| < \text{Threshold} \quad \text{(Expression 6)}$$

If the average motion vector MVave and the average motion vector MV5 satisfy Expression 6 (OP41: YES), the comparison unit 26a generates "normal" as the vector comparison information (OP44).

If the average motion vector MVave and the average motion vector MV5 satisfy Expression 6, it means that the 15 fps image frame group has been obtained from the 30 fps image frame group by the frame rate conversion. In other words, in OP41, it is determined whether or not the 15 fps image frame group has been obtained from the 30 fps image frame group by the frame rate conversion.

If the average motion vector MVave and the average motion vector MV5 do not satisfy Expression 6 (OP41: NO), then the comparison unit 26a determines whether or not the average motion vector MVave and the average motion vector MV5 satisfy the following Expression 7 (OP42).

$$\left|\frac{MV5}{4} - MVave\right| < \text{Threshold} \quad \text{(Expression 7)}$$

If the average motion vector MVave and the average motion vector MV5 satisfy Expression 7 (OP42: YES), the comparison unit 26a generates a "match" as the vector comparison information (OP43). If the vector comparison information is a "match", it means that the current frame is a candidate of a synchronization point.

If the average motion vector MVave and the average motion vector MV5 do not satisfy Expression 7 (OP42: NO), then the comparison unit 26a generates an "unmatch" as the vector comparison information (OP34). If the vector comparison information is an "unmatch", it means that it cannot be determined whether the 15 fps image frame group has been obtained from the 24 fps image frame group by the frame rate conversion.

When the processing in OP43, OP44 and OP45 ends, the processing A, which is a sub-routine of the processing in the "not synchronized" state, completes. The comparison unit 26a returns to FIG. 16, and outputs the vector comparison information to the synchronization determination unit 26b (OP6).

FIG. 18 is a flow chart depicting an example of the processing B. The processing B is a processing by the comparison unit 26a in the case of the "synchronized" state.

The comparison state 26a determines whether or not the average motion vector MVave and the average motion vector MV5 satisfy the following Expression 8 (OP51).

$$\left|MV5 \times \frac{Xn}{8} - MVave\right| < \text{Threshold } (n = 1 \sim 5) \quad \text{(Expression 8)}$$

Here Xn is the skip sequence Xn={X1, X2, X3, X4, X5} {2, 1, 2, 1, 2} illustrated in FIG. 7. The skip sequence is a frame skipping procedure which was applied to the frame rate conversion from the 24 fps to the 15 fps (see FIG. 7). In other words, the skip sequence is a sequence to indicate a frame skip pattern among five frames during ⅓ seconds at 15 fps.

In the case of Xn=1, it means that there is no frame skipped upon the frame conversion between the current frame and the frame which is one frame before the current frame in the 15 fps image frame group. In the case of Xn=2, it means that there is one frame skipped upon the frame conversion between the current frame and the frame which is one frame before the current frame in the 15 fps image frame group.

In other words, if Xn=1, it means that the average motion vector MVave between the current frame and the frame which is one frame before the current frame is an average motion vector equivalent to one frame in the 24 fps image frame group. If Xn=2, it means that the average motion vector MVave between the current frame and the frame which is one frame before the current frame is an average motion vector which is equivalent to two frames in the 24 fps image frame group. The value of n is controlled by the synchronization determination unit 26b, and one of the values X1 to X5 is used every time the processing in OP51 is executed. If X5 is used, X1 is used next. In other words, the values of X1 to X5 are used in a loop.

If the average motion vector MVave and the average motion vector MV5 do not satisfy Expression 8 (OP51: NO), the comparison unit 26a generates "normal" as the vector comparison information (OP53).

If the average motion vector MVave and the average motion vector MV5 satisfy Expression 8 (OP51: YES), the comparison unit 26a generates "don't care" as the vector comparison information (OP55). If the vector comparison information is "don't care", it means that the "synchronized" state is continuing. In other words, it is indicated that the 15 fps image frame group has been obtained from the 24 fps image frame group by the frame rate conversion.

When the processing in OP53 and OP55 ends, the processing B, which is a sub-routine of processing in the "synchronized" state, completes. Referring back to FIG. 16, the comparison unit 26a outputs the vector comparison information to the synchronization determination unit 26b (OP6).

Figure 19:
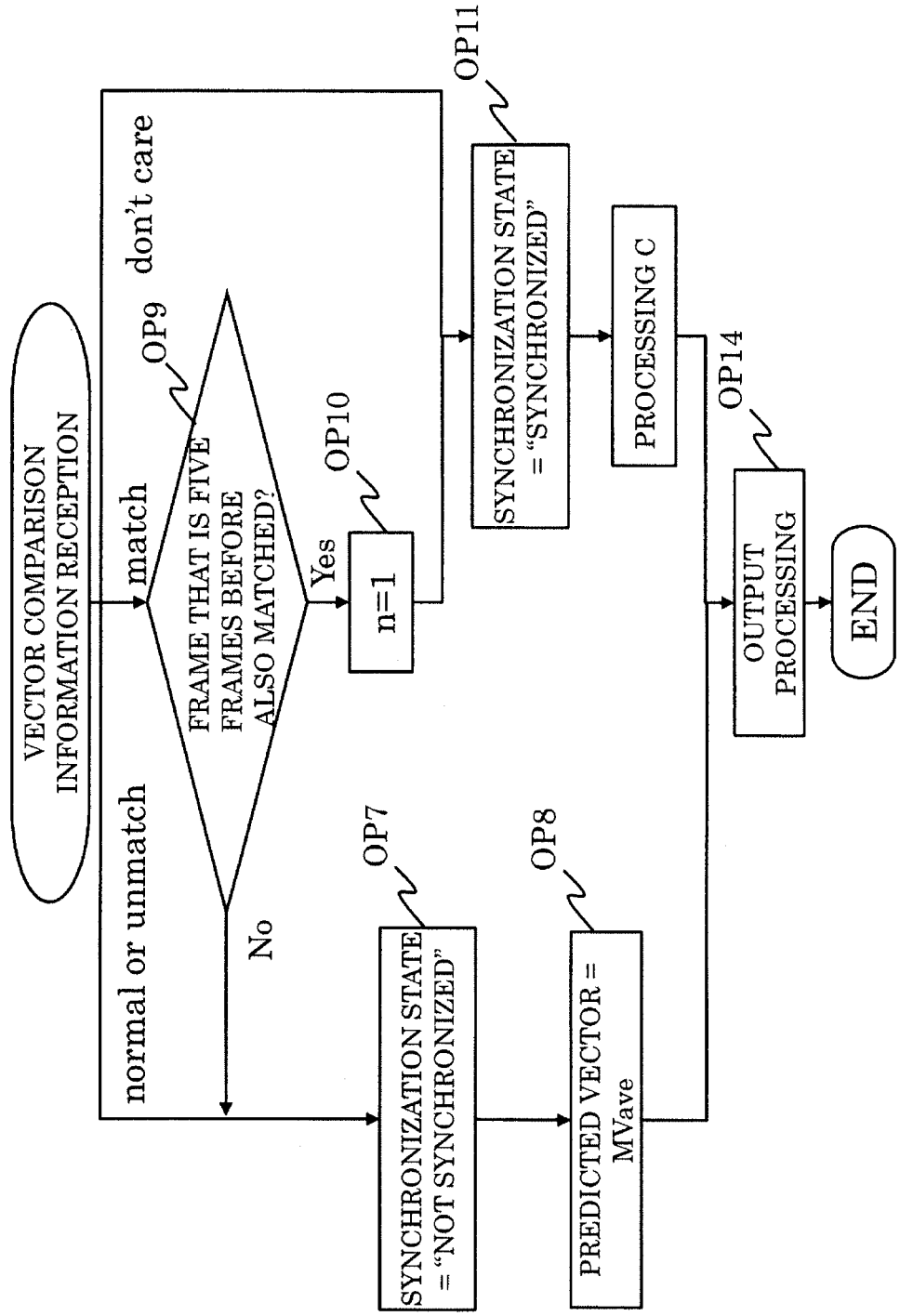
FIG. 19 is a flow chart depicting an example of processing of a synchronization determination unit.
Figure 20:
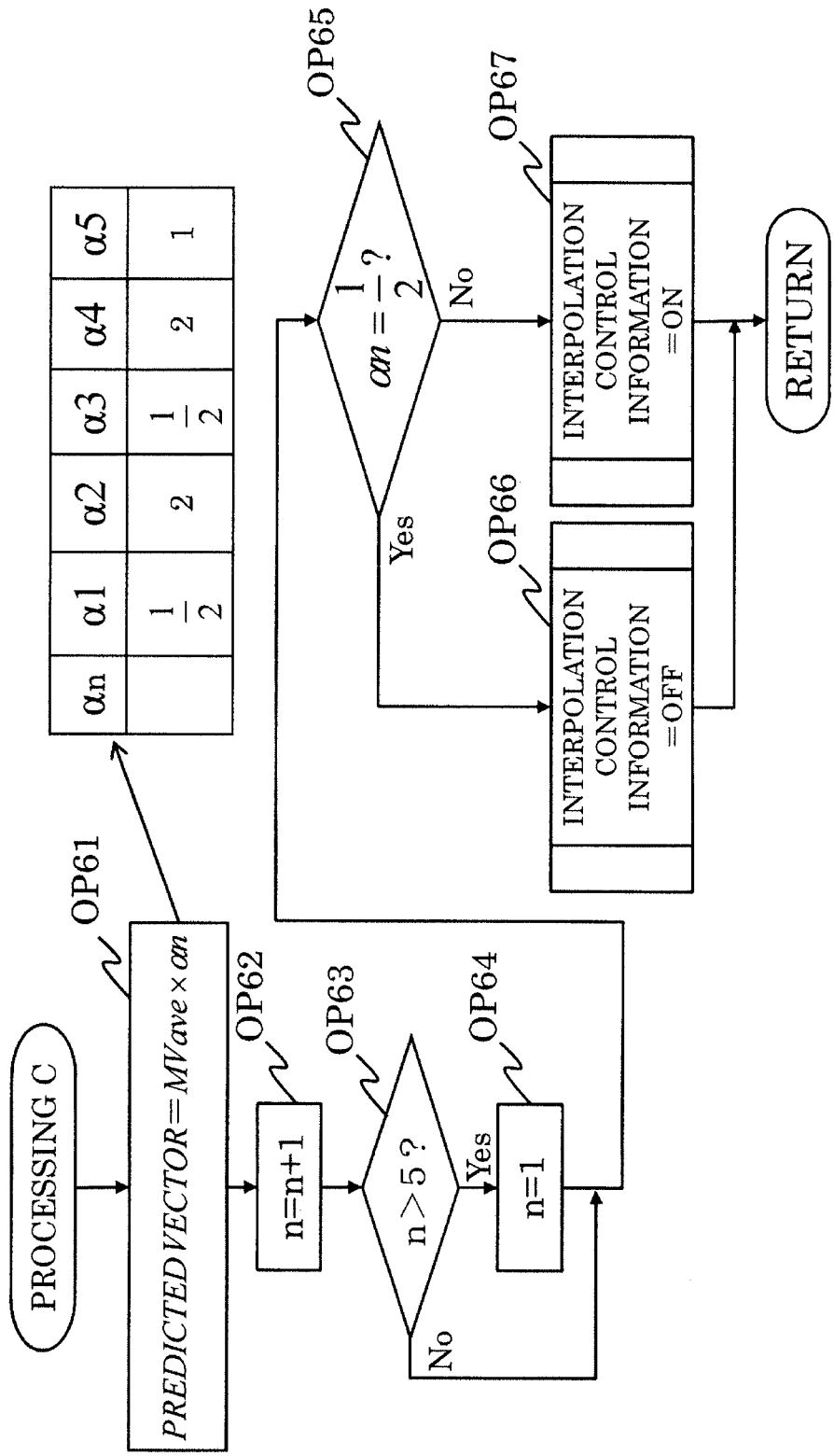
FIG. 20 is a flow chart depicting an example of processing of the synchronization determination unit (sub-routine of processing C)

Now the processing executed by the synchronization determination unit 26b will be described. FIG. 19 and FIG. 20 are flow charts depicting an example of the processing by the synchronization determination unit 26b. The synchronization determination unit 26b receives the vector comparison information from the comparison unit 26a, and starts processing.

If the vector comparison information is "normal" or "unmatch", the synchronization determination unit 26b sets the synchronization state to "not synchronized" (OP7). By this processing, it is determined that the 15 fps image frame group has been obtained from the 30 fps image frame group by the frame rate conversion.

The synchronization determination unit 26b sets MVave as a predicted vector (OP8). Then the synchronization determination unit 26b sets the synchronization state to "not synchronized", and outputs this state to the comparison unit 26a. The synchronization determination unit 26b also outputs the predicted vector to the first vector searching unit 21 (OP14). The comparison unit 26a, to which "not synchronized" state is input, updates the synchronization state to "not synchronized".

If the vector comparison information is a "match", the synchronization determination unit 26b determines whether the vector comparison information is also a "match" when the input frame which is five frames before the current frame is processed (OP9). Confirming the processing of the input frame which is five frames before the current frame here is for eliminating the case when Expression 7 is satisfied by accident. In OP6 (FIG. 16), the vector comparison information is output to the storage unit 26m as well, and the storage unit 26m holds at least vector comparison information in five frames in the past.

If the vector comparison information is not a "match" when the input frame which is five frames before the current frame is processed (OP9: NO), processing advances to OP7.

If the vector comparison information when the input frame which is five frames before the current frame is also a "match" (OP9: YES), the synchronization determination unit 26b sets the value of the variable n to n=1 (OP10). Then the synchronization determination unit 26b sets the synchronization state to "synchronized" (OP11). Then a processing C (sub-routine) is executed.

If the vector comparison information is "don't care", then the synchronization determination unit 26b sets the synchronization state to "synchronized" (OP11). Then the processing C is executed.

FIG. 20 is a flow chart depicting an example of the processing C. The processing C is a processing for the synchronization determination unit 26b to determine a predicted vector and generate the interpolation control information when it is determined that the synchronization state is "synchronized", that is, it is determined that the 15 fps image frame group has been obtained from the 24 fps image frame group by the frame rate conversion.

After setting the synchronized state to "synchronized" in OP11 in FIG. 19, the synchronization determination unit 26b determines a predicted vector used for the first vector searching unit 21 (OP61). The predicted vector is determined by the following Expression 9.

Predicted vector=MVave×αn    (Expression 9)

Here αn (n=1 to 5) is a predicted vector control multiplier (see FIG. 8). The predicted vector control multiplier αn is defined by αn={α1, 2, α3, α4, α5}={½, 2, ½, 2, 1}.

The synchronization determination unit 26b sets the current variable n to n=n+1 (OP62). Then the synchronization determination unit 26b determines whether the value of the current variable n is greater than 5 (OP63). If the current variable n is greater than 5 (OP63: YES), it means that the skip sequence of the frame completed a cycle, so the synchronization determination unit 26b sets the variable n to n=1 (OP64). Then processing advances to OP65.

If the current variable n is not greater than 5 (OP63: NO), processing advances to OP65.

The synchronization determination unit 26b determines whether or not the predicted vector control multiplier αn is αn=½ (OP65). If the predicted vector control multiplier αn is αn=½ (OP65: YES), the synchronization determination unit 26b generates interpolation control information "OFF" to instruct the generation unit 27 not to perform the frame interpolation (OP66). If the predicted vector control multiplier αn is not αn=½ (OP65: NO), the synchronization determination unit 26b generates the interpolation control information "ON" to instruct the generation unit 27 to perform the frame interpolation (OP67).

The predicted vector control multiplier αn corresponds to the skip sequence Xn+1 in terms of the value n. In other words, if αn=½, then Xn+1=1. If Xn+1=1, it means that there is no frame skipped by the frame rate conversion between the current frame of the 15 fps image frame group and the frame which is immediately before the current frame. Therefore if αn=½, it can be determined that an interpolation frame need not be generated between the current frame and the frame that is immediately before the current frame.

When the processing in OP66 and OP67 ends, the processing C completes. Referring back to FIG. 19, the synchronization determination unit 26b outputs the synchronization state and the value of the variable n to the comparison unit 26a. The synchronization determination unit 26b outputs the predicted vector to the first vector searching unit 21. The synchronization determination unit 26b outputs the interpolation control information to the generation unit 27 (OP14). The comparison unit 26a, which received the synchronization state and the value of the variable n, updates the synchronization state and the value of the variable n, then starts processing from OP1 in FIG. 16 when the average motion vector MVave, average motion vector M5 and the scene detection information are input thereafter.

The thresholds in OP41 (Expression 6), OP42 (Expression 7) and OP51 (Expression 8) are thresholds determined from the average motion vector MVave and the average motion vector MV5, and the unit thereof is a pixel. Therefore such a value as two pixels can be used for a threshold.

The value n is set by the processing in OP42 (FIG. 17) by the comparison unit 26a and the processing in OP9 and OP10 (FIG. 19) by the synchronization determination unit 26b. If the value n is set, the frame skip sequence Xn and the predicted vector control multiplier αn are specified. If the frame skip sequence Xn and the predicted vector control multiplier αn are specified, then the interpolation control information to indicate whether or not the frame interpolation is performed and the predicted vector are determined.

Since the predicted vector is fed back, as described above, the detection unit 26 can specify the frame skip sequence Xn in the case when it is detected that the 15 fps image frame group has been obtained from the 24 fps image frame group by the frame rate conversion. By specifying the frame skip sequence Xn, the detection unit 26 can determine whether or not the frame interpolation is performed.

Along with specifying the frame skip sequence Xn, the predicted vector control multiplier αn is specified. The detection unit 26 calculates the predicted vector by multiplying the average motion vector MVave by a specified predicted vector control multiplier αn. By feeding back this predicted vector, a more accurate motion vector is determined for the next input frame. If a more accurate motion vector is determined, an interpolation frame with higher accuracy is created. By the creation of an interpolation frame with higher accuracy, moving images with more natural movement can be provided.

<<Processing of Generation Unit>>

The generation unit 27 creates an interpolation frame when the interpolation control information "ON" is received from the synchronization determination unit 26b.

Figure 21:
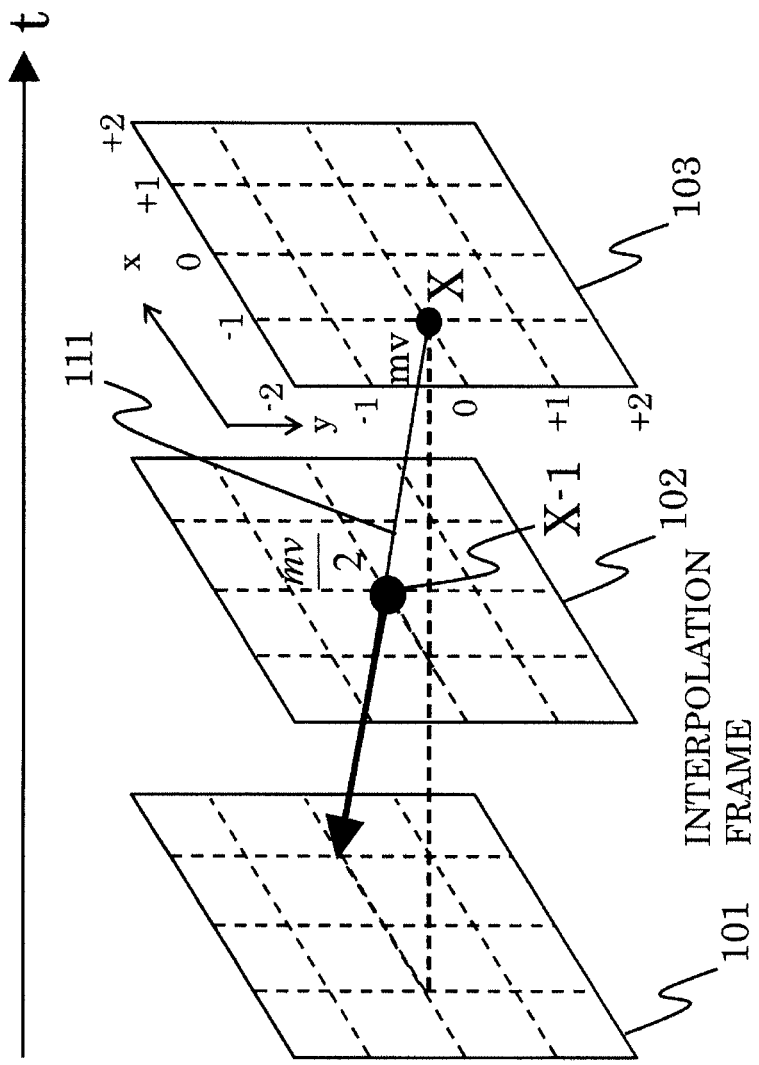
FIG. 21 is a diagram depicting an example of an interpolation frame generation processing.

FIG. 21 is a diagram depicting an example of an interpolation frame generation processing. FIG. 21 illustrates a processing for determining an interpolation pixel on an interpolation frame 102 when the generation unit 27 creates the interpolation frame 102 in the center of a frame 101 and a frame 103. To simplify description, FIG. 21 illustrates coordinates (x, y) on the frame (−2≤x≤+2, −2≤y+2).

The generation unit 27 receives a motion vector mv (i, j) (i=0, 1, . . . , Nx−1, j=0, 1, . . . , Ny−1) between the frame 103 and the frame 101 which is one frame before the frame 103 from the first vector searching unit 21 as input. Nx and Ny denote the number of pixels in the horizontal direction and the vertical direction respectively.

The generation unit 27 determines an interpolation pixel X−1 on the interpolation frame 102. The generation unit 27 multiplies the value of the x component and the value of the y component of the motion vector mv (i, j) 111 of the block centering around the pixel X by ½ respectively, and adds the determined values to the coordinates of the pixel X.

For example, in the case of the motion vector mv (i, j)=(+2, 0) on the block centering around the pixel X (−1, 0), the generation unit 27 calculates the interpolation pixel X−1 on the interpolation frame 102 regarding (x, y)=(0, 0).

The generation unit 27 determines the interpolation pixel on the interpolation frame 102 for the other pixels as well in the same manner.

If the interpolation pixel is represented by coordinates which do not exist on the interpolation frame 102, the generation unit 27 determines an interpolation pixel from the neighboring four pixels based on quadratic linear interpolation.

<<Functional Effect of the Second Embodiment>>

In the 15 fps image frame group, the information processing apparatus 2 calculates the average motion vector MVave between a current frame and a frame which is one frame before the current frame, and the average motion vector MV5 between the current frame and a frame which is five frames before the current frame. If the average motion vector MVave is in an allowable range where the average motion vector MVave is regarded as equal to ¼ the average motion vector MV5, the information processing apparatus 2 can detect that the 15 fps image frame group has been obtained from the 24 fps image frame group by the frame rate conversion.

In addition to this, the information processing apparatus 2 can specify the frame skip pattern (skip sequence Xn) upon the frame rate conversion from the 24 fps image frame group to the 15 fps image frame group by using a predicted vector. By specifying the frame skip sequence, timing when the frame interpolation is requested can be specified, and the frame interpolation can be executed appropriately.

An even more accurate motion vector can be determined if the average motion vector MVave between the current frame and a frame which is one frame before the current frame is multiplied by the predicted vector control multiplier αn, and the result is used as the predicted vector. The more accurate that a motion vector is used, the more accurate interpolation frame can be generated.

As described above, according to the information processing apparatus 2, interpolation frames can be correctly interpolated among the 15 fps image frames, even if the 15 fps image frame group is generated from the 24 fps image frame group by the frame rate conversion.

The information processing apparatus 2 performs the motion vector inspection only in the case of a specific scene which is greatly influenced by skipping among frames due to the frame rate conversion. By limiting the motion vector inspection to specific scenes, the frame interpolation processing is minimized, and the load on the information processing apparatus 2 can be decreased.

<<Variant Form of Second Embodiment>>

In the second embodiment, the information processing apparatus 2 detects that the 15 fps image frame group has been obtained from the 24 fps image frame group by the frame rate conversion, and performs frame interpolation based on this detection result. Instead of this, the information processing apparatus 2 may perform frame interpolation based on the ratio of the predicted vector and the average motion vector MVave. The predicted vector in this case is an average motion vector between a frame which is immediately before a current frame of the 15 fps image frame group and a frame which is two frames before the current frame in the 15 fps image frame group.

As FIG. 8 indicates, in the case of obtaining the 15 fps image frame group from the 24 fps image frame group by the frame rate conversion, the motion vector between the current frame and the frame which is immediately before the current frame and the motion vector between the frame which is immediately before the current frame and the frame which is two frames before the current frame match once every five frames. For example, in the case of FIG. 8, the motion vector between the frame F and the frame D and the motion vector between the frame D and the frame B match. Actually, however, the motion vector between the frame F and the frame D and the motion vector between the frame D and the frame B do not match, since the motion vectors are estimated values. In other words, an error is generated. Therefore, by setting a range where it is regarded that the motion vector between the frame F and the frame D and the motion vector between the frame D and the frame B match, the synchronization point can be detected.

In this case, all that is requested is that the information processing apparatus 2 includes the first vector searching unit 21, the first calculation unit 22, the detection unit 26, the generation unit 27, the buffer 28a, the input unit 29 and the output unit 30 (see FIG. 9). The first vector searching unit 21, the first calculation unit 22, the generation unit 27, the buffer 28a, the input unit 29 and the output unit 30 execute the processing described in the second embodiment.

The detection unit 26 receives an average motion vector MVave from the first calculation unit 22 as input, and stores it in the storage unit 26m. Each time an average motion vector MVave is input, the detection unit 26 reads an average motion vector of the frame one frame before the current frame from the storage unit 26m, and determines whether these average motion vectors MVave are in a range regarded as being matched. If these average motion vectors MVave are in a range regarded as being matched, the detection unit 26 sets the variable n to n=1, and obtains the predicted vector control multiplier α1 stored in the storage unit 26m. If the predicted vector control multiplier αn is obtained, the detection unit 26 executes the processing illustrated in FIG. 20. The detection unit 26 executes this processing every time an average motion vector MVave is input. In this case, the predicted vector control multiplier αn is also called a "skip pattern".

The information processing apparatus 2 can specify the base point of a skip pattern (predicted vector control multiplier αn) by detecting a point where an average motion vector MVave and the average motion vector MVave in the frame one frame before the current frame are regarded as a match. By specifying the base point of the skip pattern, the information processing apparatus 2 can perform frame interpolation appropriately.

<<Hardware Configuration of Information Processing Apparatus>>

Figure 22:
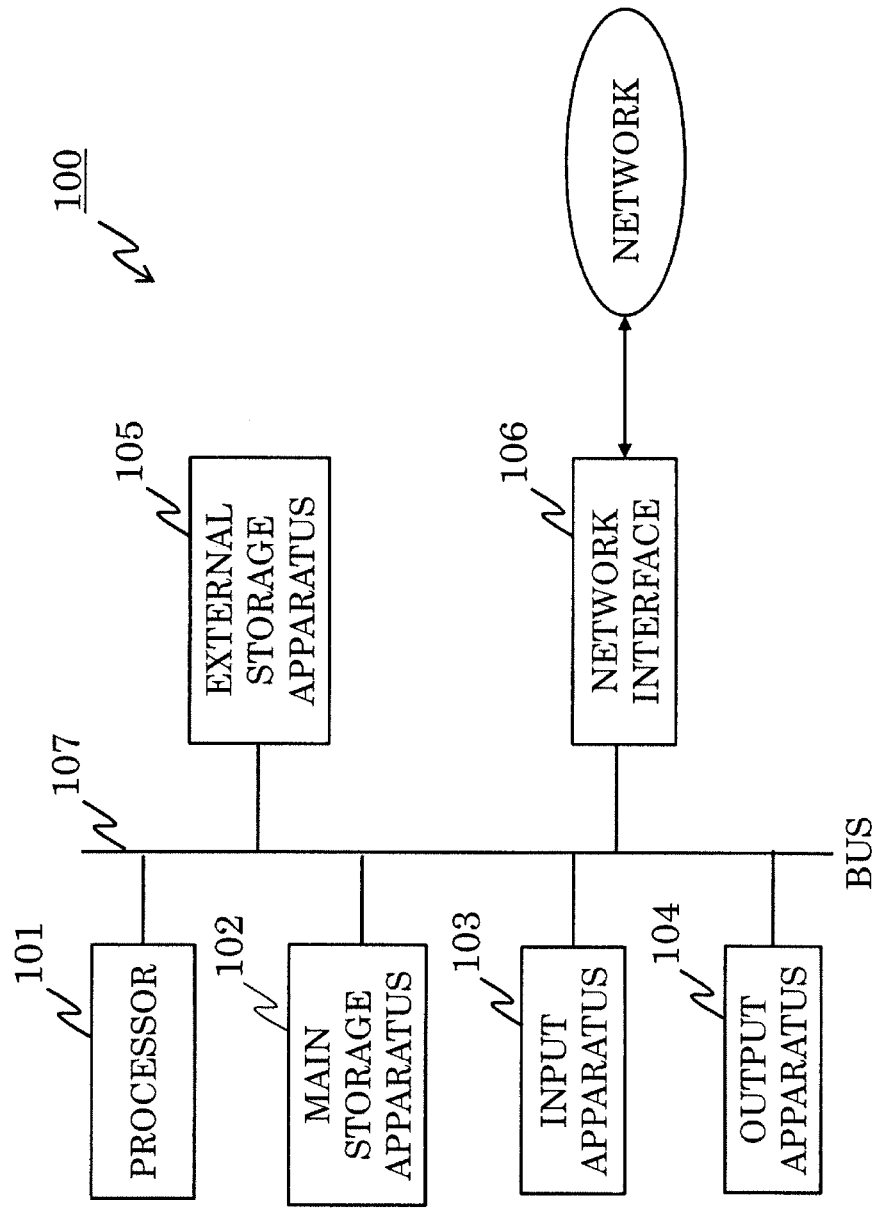
FIG. 22 is a diagram depicting a configuration example of hardware of the information processing apparatus.

FIG. 22 is a diagram depicting a hardware configuration example of the information processing apparatus 1 of the first embodiment and the information processing apparatus 2 of the second embodiment. The information processing apparatus 1 of the first embodiment and the information processing apparatus 2 of the second embodiment can be implemented using a generation purpose computer, such as a personal computer. The information processing apparatus 1 of the first embodiment can be implemented using a dedicated computer which inspects motion vectors between frames. The information processing apparatus 2 of the second embodiment can be implemented using a dedicated computer which generates interpolation frames among the 15 fps image frames.

The information processing apparatus 100 has a processor 101, a main storage apparatus 102, an input apparatus 103, an output apparatus 104, an external storage apparatus 105 and a network interface 106. These components are interconnected by a bus 107. In the information processing apparatus 100, a program stored in the external storage apparatus 105 is loaded into a work area of the main storage apparatus 102, and executed by the processor 101. As the program is in-execution, the information processing apparatus 100 controls the input apparatus 103, the output apparatus 104 and the network interface 106, among other components, so as to implement functions matching a predetermined purpose.

The processor 101 reads a program stored in the external storage apparatus 105, loads the program into the main storage apparatus 102, and executes the program. According to the program, the processor 101 processes the information from the input apparatus 103, for example, and outputs the result to the output apparatus 104, or stores the result in the external storage apparatus 105. The processor 101 is, for example, a CPU (Central Processing Unit) or a DSP (Digital Signal Processor).

The main storage apparatus 102 provides the processor 101 with a storage area for loading a program stored in the external storage apparatus 105, and a work area thereof, or is used as a buffer. The main storage apparatus 102 includes, for example, a ROM (Read Only Memory) and a RAM (Random Access Memory).

The input apparatus 103 receives signals from the other apparatuses and input from the user, and outputs these to the processor 101 as input signals. The input apparatus 103 includes, for example, an IC chip which store electronic circuits dedicated to processing input signals, a keyboard and a pointing device. The input apparatus 103 can also include such a moving image input apparatus as a camera. The input apparatus 103 can also include such a voice input apparatus as a microphone.

The output apparatus 104 receives the operation result from the processor 101, and outputs it to another apparatus or the user. The output apparatus 104 includes, for example, an IC chip which store electronic circuits dedicated to processing for converting the operation result into an output signal format, a display and a speaker.

The external storage apparatus 105 stores, for example, programs to be read to the processor 101, and the processed result by the processor 101. The external storage apparatus 105 is, for example, an EPROM (Erasable Programmable ROM) or a hard disk drive (HDD). The external storage apparatus 105 can include a removable media, that is a portable recording media. The removable media is, for example, an USB (Universal Serial Bus) memory or such a disk recording media as a CD (Compact Disk) and DVD (Digital Versatile Disk).

The network interface 106 is an interface to input/output information to/from the network. The network interface 106 connects a cable network and a radio network. The network interface 106 is, for example, an NIC (Network Interface Card) or a radio LAN (Local Area Network) card.

The information processing apparatus 100 is, for example, a portable telephone terminal, a One Seg receiver, a portable game machine, a personal computer and a car navigation system having a tuner for One Seg. IC chips stored in these apparatuses are also included in the information processing apparatus 100.

The information processing apparatus 100 used as the information processing apparatus 1 of the first embodiment implements functions as the first motion vector unit 12, the second motion vector unit 14 and the detection unit 15 by controlling the input apparatus 103, the output apparatus 104 and the network interface 106 via the processor 101 executing programs on the external storage apparatus 105. The input unit 11 is implemented by the processor 101 controlling the input apparatus 103. The output unit 16 is implemented by the processor 101 controlling the output apparatus 104. The storage unit 13 is created in a storage area of the main storage apparatus 102 statically or during the execution steps of the program.

The information processing apparatus 100 used as the information processing apparatus 2 of the second embodiment implements functions as the first vector searching unit 21, the first calculation unit 22, the second vector searching unit 23, the second calculation unit 24, the analysis unit 25, the detection unit 26 and the generation unit 27 by controlling the input apparatus 103, the output apparatus 104 and the network interface 106 via the processor 101 executing programs on the external storage apparatus 105. The input unit 29 is implemented by the processor 101 controlling the input apparatus 103. The output unit 30 is implemented by the processor 101 controlling the output apparatus 104. The buffers 28a to 28e and the storage unit 26m are created in a storage area of the main storage apparatus 102 statically or during executing steps of the program.

<<Application Examples>>

Application examples of the information processing apparatus 2 of the second embodiment will now be described with reference to FIG. 23 to FIG. 27.

Figure 23:
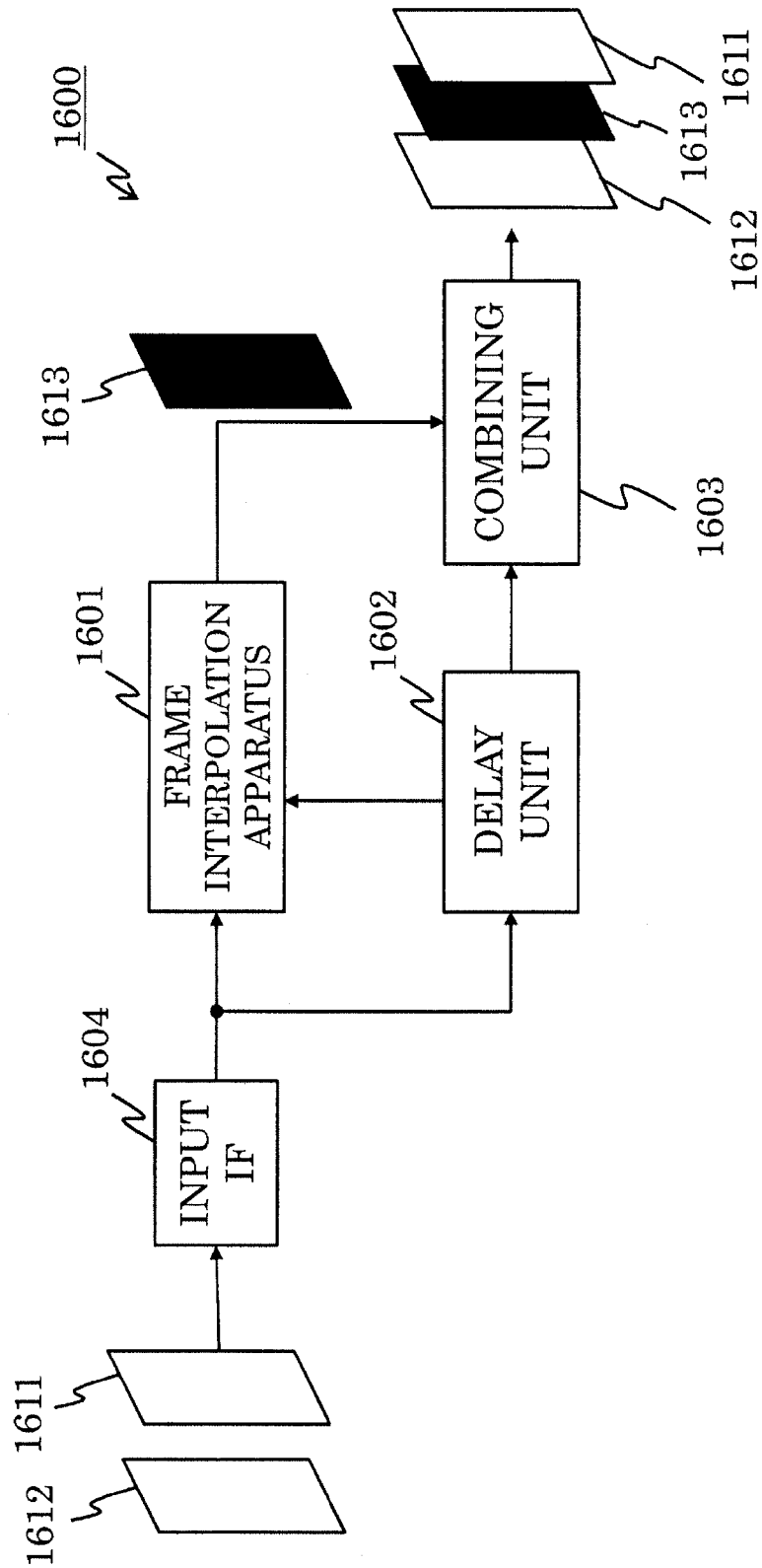
FIG. 23 is a diagram depicting a configuration example of a frame rate conversion apparatus.

FIG. 23 is a diagram depicting a configuration example of a frame rate conversion apparatus using the information storage apparatus 2 of the second embodiment. The frame rate conversion apparatus 1600 has a frame interpolation apparatus 1601, a delay unit 1602, and a switch 1603, so as to improve the frame rate of input moving images. The frame interpolation apparatus 1601 is an apparatus equivalent to the frame interpolation apparatus 2 (information processing apparatus 2).

The delay unit 1602 delays the frames 1611 and 1612, which are input continuously, by a predetermined time, and outputs them.

The frame interpolation unit 1601 generates an interpolation frame 1613 from the frame 1612 at the current time, and the image frame 1611 at the time before being output from the delay unit 1602, as described in the second embodiment.

The combining unit switch 1603 receives the image frames which are output from the delay unit 1602 and the interpolation frame 1613 which is output from the frame interpolation apparatus 1601, and rearranges the frames.

Figure 24:
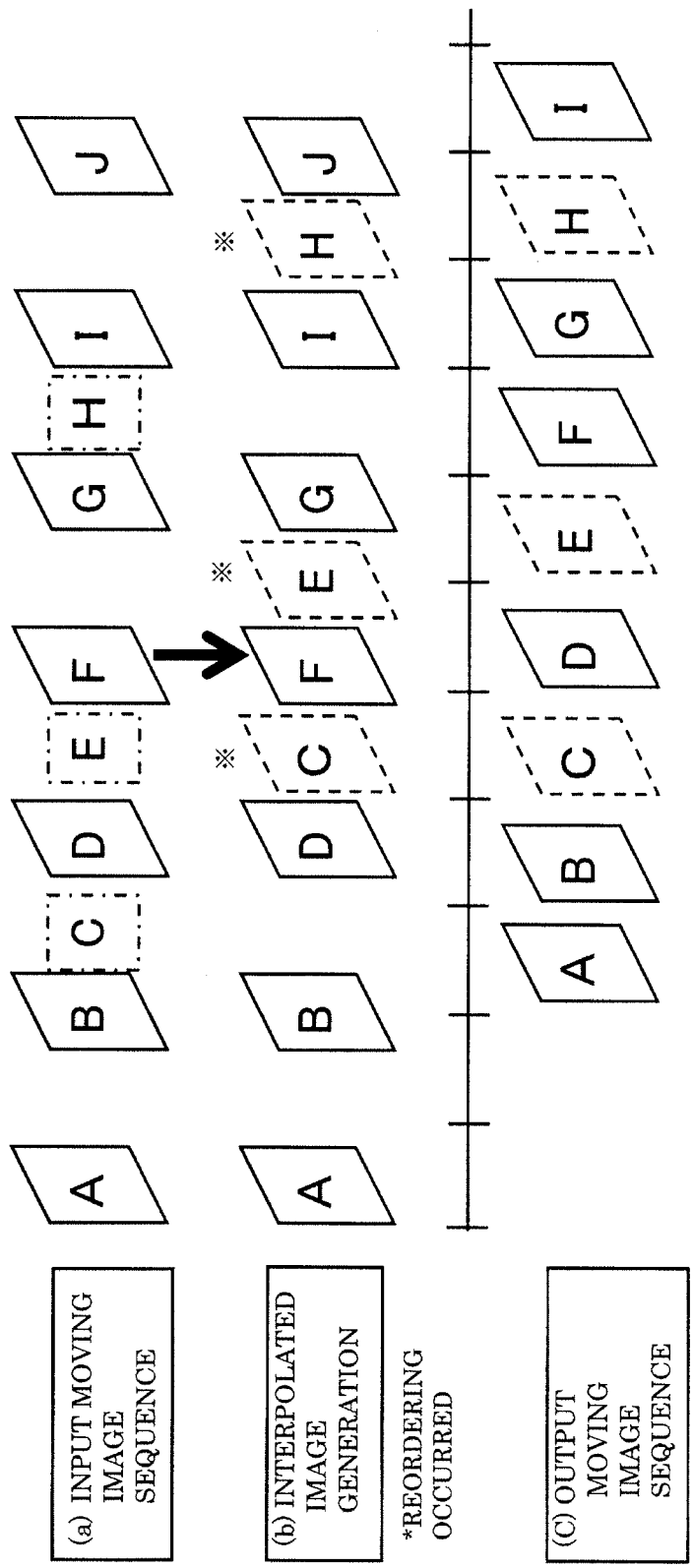
FIG. 24 is a diagram depicting an example of frame rearrangement processing.

FIG. 24 is a diagram depicting a frame rearrangement processing by the combining unit 1603. When the interpolation apparatus 1601 generates an interpolation frame, the interpolation frame is generated after the original position with respect to the input image sequence, as illustrated in FIG. 24 (see (b) interpolation image generation sequence in FIG. 24). The combining unit 1603 buffers the input frames and the interpolation frames, and rearranges the sequence of the frames with reference to the frame identification information which is assigned to each frame to indicate the sequence of the frame. This processing to rearrange the sequence is called "re-ordering". The frame identification information is assigned when a frame is generated. The interpolation frame identification information is generated from frames used upon generating the interpolation frame, and attached to the interpolation frame.

Thus the combining unit 1603 interpolates interpolation frames among the frames which were input at 15 fps, and rearranges the frames, so as to output the frames at 24 fps.

Thereby the frames are output from the frame rate conversion apparatus in the sequence of the image frame 1611, the interpolation frame 1613 and the image frame 1612.

Figure 1:
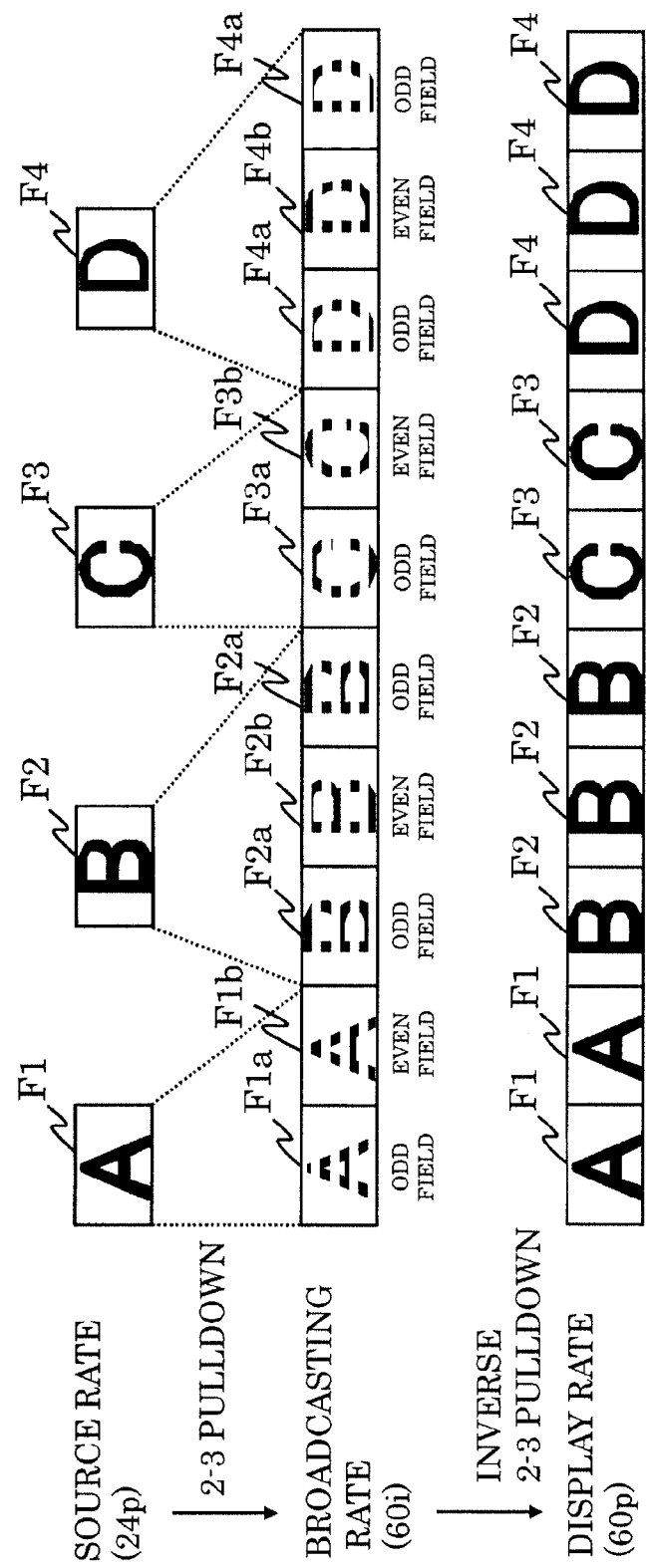
FIG. 1 is a diagram depicting an example of a 2-3 pulldown processing.

If frames are output from the combining unit 1603 to a 60p progressive scan type display, for example, the 2-3 pulldown processing (see FIG. 1) is executed and displayed on the display. Then the progressive scan type display can regenerate the image frame group which is input at 15 fps as a 60p image frame group more naturally.

Figure 25:
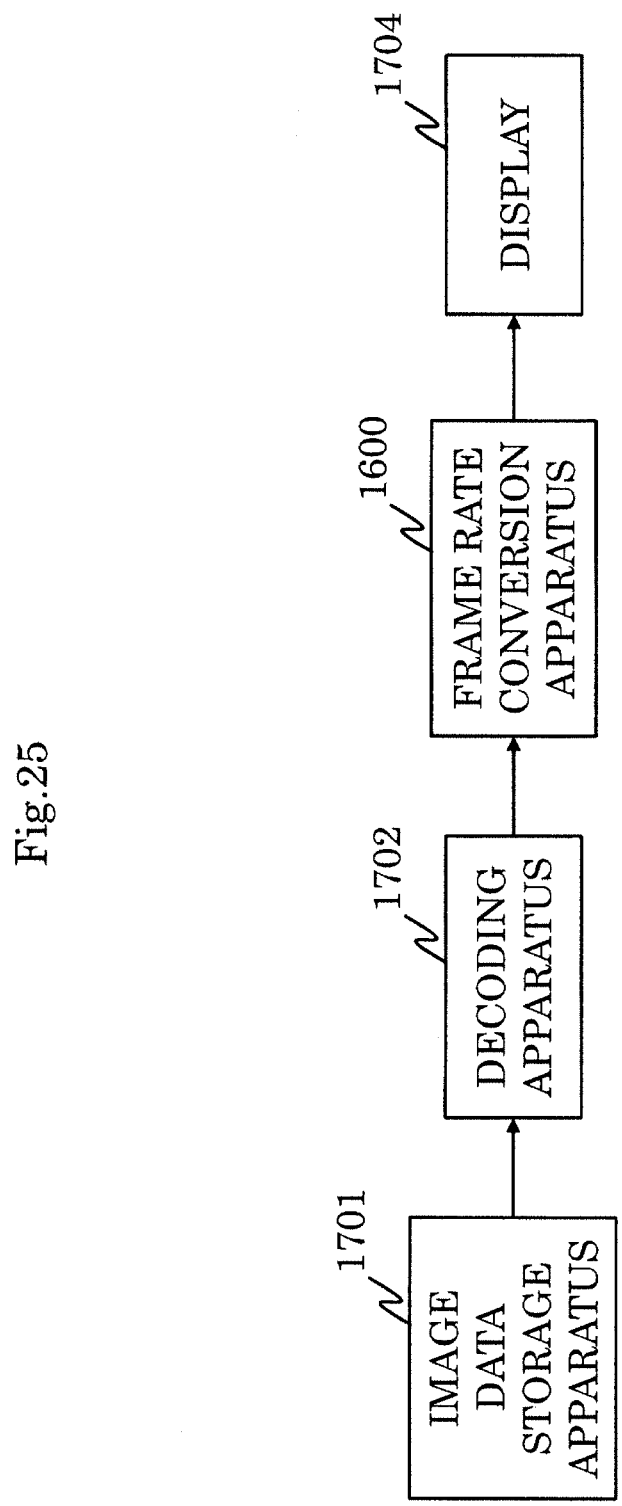
FIG. 25 is a diagram depicting a configuration example of an image replay apparatus using the frame rate conversion apparatus in FIG. 23.

FIG. 25 is a diagram depicting a configuration example of an image replay apparatus using the frame rate conversion apparatus 1600 in FIG. 23. This image replay apparatus has an image data storage apparatus 1701, a decoding apparatus 1702, a frame rate conversion apparatus 1600 and a display 1704.

The image data storage apparatus 1702 stores 15 fps image data. The decoding apparatus 1702 decodes the image data stored in the image data storage apparatus 1701, and outputs the image frames. The frame rate conversion apparatus 1600 inserts the interpolation frames among the image frames, and the display 1704 displays these frames on the screen in a time series.

FIG. 26 is a diagram depicting a configuration example of an image display apparatus using the frame rate conversion apparatus 1600 in FIG. 23. The image display apparatus has an image data receiver 1801, a frame rate conversion apparatus 1600 and a display 1802. The image data receiver 1801 receives the image frames at 15 fps from the communication network. The frame rate conversion apparatus 16003 inserts the interpolation frames among the image frames. The display 1802 displays these frames on the screen in a time series.

Suppose the display 1802 is a 60p progressive scan type display, for example. If 30 fps image frames are received from the frame rate conversion apparatus 1600 in this case, the display 1802 copies each frame to be two frames, so as to display the frames at 60p. If image frames are received from the frame rate conversion apparatus 1600 at 24 fps, the display 1802 performs the 2-3 pulldown processing (see FIG. 1), so as to display the frames at 60p.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image processing apparatus which detects a second image frame group, of which frame rate is converted from a source rate of a first image frame group, that is an m number of frames per predetermined time, into an n (n<m) number of frames per same predetermined time by skipping frames from the first image frame group, comprising:
   a first motion vector calculation unit to determine a first motion vector, which is a motion vector between one image frame and an image frame immediately before this one image frame in the second image frame group;
   a second motion vector calculation unit to determine, as a second motion vector, a motion vector between one image frame and an image frame which is n frames before this one image frame in the second image frame group; and
   a detection unit to detect that the second image frame group is obtained from the first image frame group by the frame conversion, when the ratio of the first motion vector and the second motion vector is in a range recognized as a predetermined ratio which is determined by the number of frames m and a frame skip pattern.

2. The image processing apparatus according to claim 1, further comprising:
   a holding unit to hold a frame skip pattern executed in the frame rate conversion;
   a decision unit to determine a base point of the skip pattern when it is detected that the second image frame group is obtained from the first image frame group by the frame rate conversion; and
   a generation unit to generate interpolation frames to be inserted among the image frames of the second image frame group where the image frames of the first image frame group are skipped by the frame conversion according to the skip pattern.

3. A non-transitory computer readable recording medium recording a program for causing an image processing apparatus to execute processing to detect a second image frame group, of which frame rate is converted from a source rate of a first image frame group, that is an m number of frames per predetermined time, into an n (n ≤m) number of frames per same predetermined time by skipping frames from the first image frame group, the processing comprising:
   determining a first motion vector, which is a motion vector between one image frame and an image frame immediately before this one image frame in the second image frame group;
   determining, as a second motion vector, a motion vector between one image frame and an image frame which is n frames before this one image frame in the second image frame group; and
   detecting that the second image frame group is obtained from the first image frame group by the frame conversion, when the ratio of the first motion vector and the second motion vector is in a range recognized as a predetermined ratio which is determined by the number of frames m and a frame skip pattern.

4. An image processing apparatus which performs frame interpolation for an image frame group in which frame rate is converted from a source rate to a predetermined frame rate by skipping image frames, comprising:
   a holding unit to hold a frame skip pattern executed in the frame rate conversion;
   a calculation unit to calculate a motion vector between a current image frame and an image frame immediately before the current image frame in the image frame group;
   a decision unit which determines, as a base point of the skip pattern, a point where the motion vector between the current image frame and the image frame immediately before the current image frame in the image frame group coincides with a predicted vector which is a motion vector in the past calculated by the calculation unit; and
   a generation unit to generate interpolation frames to be inserted among the image frames of the image frame group where the image frames are skipped by the frame conversion according to the skip pattern.

5. A non-transitory computer readable recording medium recording a program for causing an information processing apparatus to execute processing to perform frame interpolation for an image frame group in which frame rate is converted from a source rate to a predetermined frame rate by skipping image frames, the processing comprising:

calculating a motion vector between a current image frame and an image frame immediately before the current image frame in the image frame group;

determining, as a base point of the skip pattern performed in the frame rate conversion, a point where the motion vector between the current image frame and the image frame immediately before the current image frame in the image frame group coincides with a predicted vector which is a motion vector in the past calculated by the calculation unit; and generating interpolation frames to be inserted among the image frames of the image frame group where the image frames are skipped by the frame conversion according to the skip pattern.

* * * * *

UNITED STATES PATENT AND TRADEMARK OFFICE
CERTIFICATE OF CORRECTION

PATENT NO. : 8,593,571 B2
APPLICATION NO. : 13/243389
DATED : November 26, 2013
INVENTOR(S) : Teruyuki Sato It is certified that error appears in the above-identified patent and that said Letters Patent is hereby corrected as shown below:

In the Claims

In Column 28, Line 33, Claim 3, delete "($n \leq m$)" and insert --($n < m$)-- therefor.

Signed and Sealed this
Third Day of June, 2014

Michelle K. Lee
*Deputy Director of the United States Patent and Trademark Office*